United States Patent
Scheppmann

(10) Patent No.: US 7,508,956 B2
(45) Date of Patent: Mar. 24, 2009

(54) SYSTEMS AND METHODS FOR MONITORING AND TRACKING MOVEMENT AND LOCATION OF SHIPPING CONTAINERS AND VEHICLES USING A VISION BASED SYSTEM

(75) Inventor: Leroy E. Scheppmann, San Diego, CA (US)

(73) Assignee: APS Technology Group, Inc., San Diego, CA (US)

(*) Notice: Subject to any disclaimer, the term of this patent is extended or adjusted under 35 U.S.C. 154(b) by 1145 days.

(21) Appl. No.: 10/861,678

(22) Filed: Jun. 4, 2004

(65) Prior Publication Data
US 2005/0027435 A1    Feb. 3, 2005

Related U.S. Application Data

(60) Provisional application No. 60/475,810, filed on Jun. 4, 2003.

(51) Int. Cl.
*G06K 9/00* (2006.01)
(52) U.S. Cl. ............. 382/103; 382/104; 348/148
(58) Field of Classification Search ............. 382/100, 382/103, 104; 348/143, 148, 149; 340/933, 340/988; 414/139.9, 143.2
See application file for complete search history.

(56) References Cited

U.S. PATENT DOCUMENTS

| | | | |
|---|---|---|---|
| 4,264,927 A | 4/1981 | Raymond et al. | 358/108 |
| 4,462,045 A | 7/1984 | Norris | 358/93 |
| 5,142,658 A * | 8/1992 | McMorran et al. | 382/1 |
| 5,638,420 A | 6/1997 | Armistead | 378/57 |
| 5,646,853 A | 7/1997 | Takahashi et al. | 364/436 |
| 5,712,789 A | 1/1998 | Radican | 364/478.14 |
| 5,757,286 A | 5/1998 | Jonsson et al. | 340/937 |
| 5,780,826 A * | 7/1998 | Hareyama et al. | 235/385 |
| 6,148,291 A | 11/2000 | Radican | 705/28 |
| 6,332,098 B2 | 12/2001 | Ross et al. | 700/226 |
| 6,359,647 B1 | 3/2002 | Sengupta et al. | 348/154 |
| 6,437,819 B1 | 8/2002 | Loveland | 348/143 |
| 2002/0089423 A1 | 7/2002 | Przygida, Jr. | 340/540 |
| 2002/0105578 A1 | 8/2002 | Hunter | 348/169 |
| 2002/0140813 A1 | 10/2002 | Trajkovic et al. | 348/170 |
| 2002/0196330 A1 | 12/2002 | Park et al. | 348/49 |
| 2003/0076417 A1 | 4/2003 | Thomas et al. | 348/169 |
| 2003/0190057 A1 * | 10/2003 | Takehara et al. | 382/104 |
| 2004/0126015 A1 * | 7/2004 | Hadell | 382/181 |

* cited by examiner

*Primary Examiner*—Andrew W Johns
(74) *Attorney, Agent, or Firm*—Alston & Bird LLP

(57) ABSTRACT

The invention provides for systems and methods for location-identification and monitoring of objects, such as shipping containers, at a transit terminal using an automated vision based tracking system. Such a system is ideally suited to provide minimal error rates, low cost implementation, real-time data and automatic merging of data with corresponding object identification systems and terminal operating systems. The systems and methods of the present invention provide for location-tracking of objects without the need to retrofit the objects with a tagging or marker device. The vision-based system incorporates the use of multiple imaging devices and a hand-off method for tracking the location of the objects over extended distances.

55 Claims, 17 Drawing Sheets

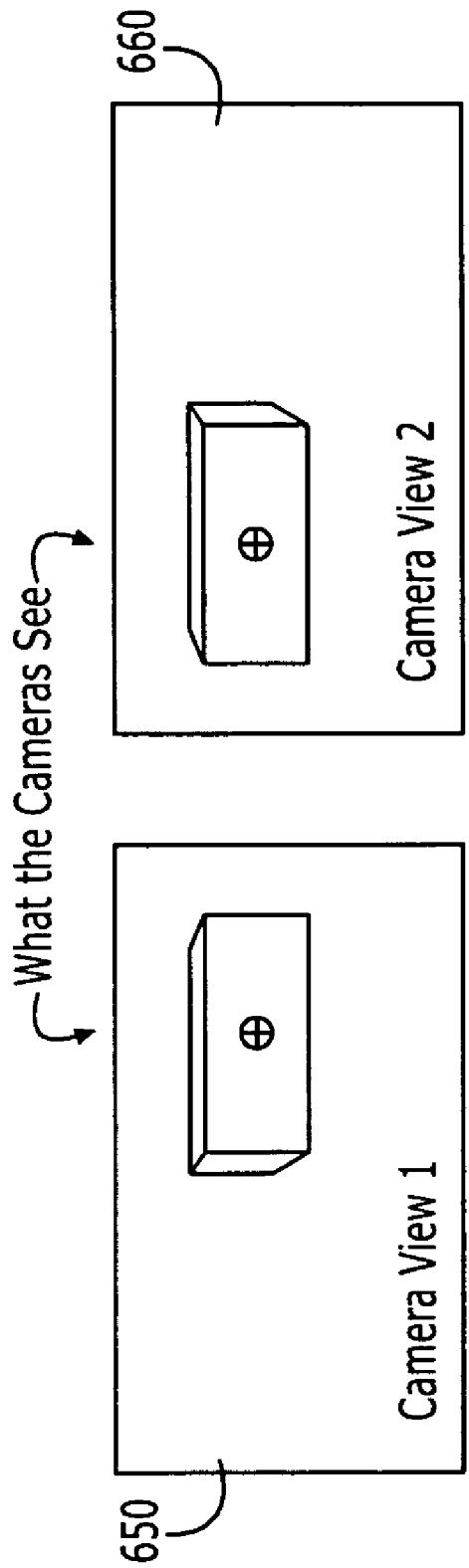
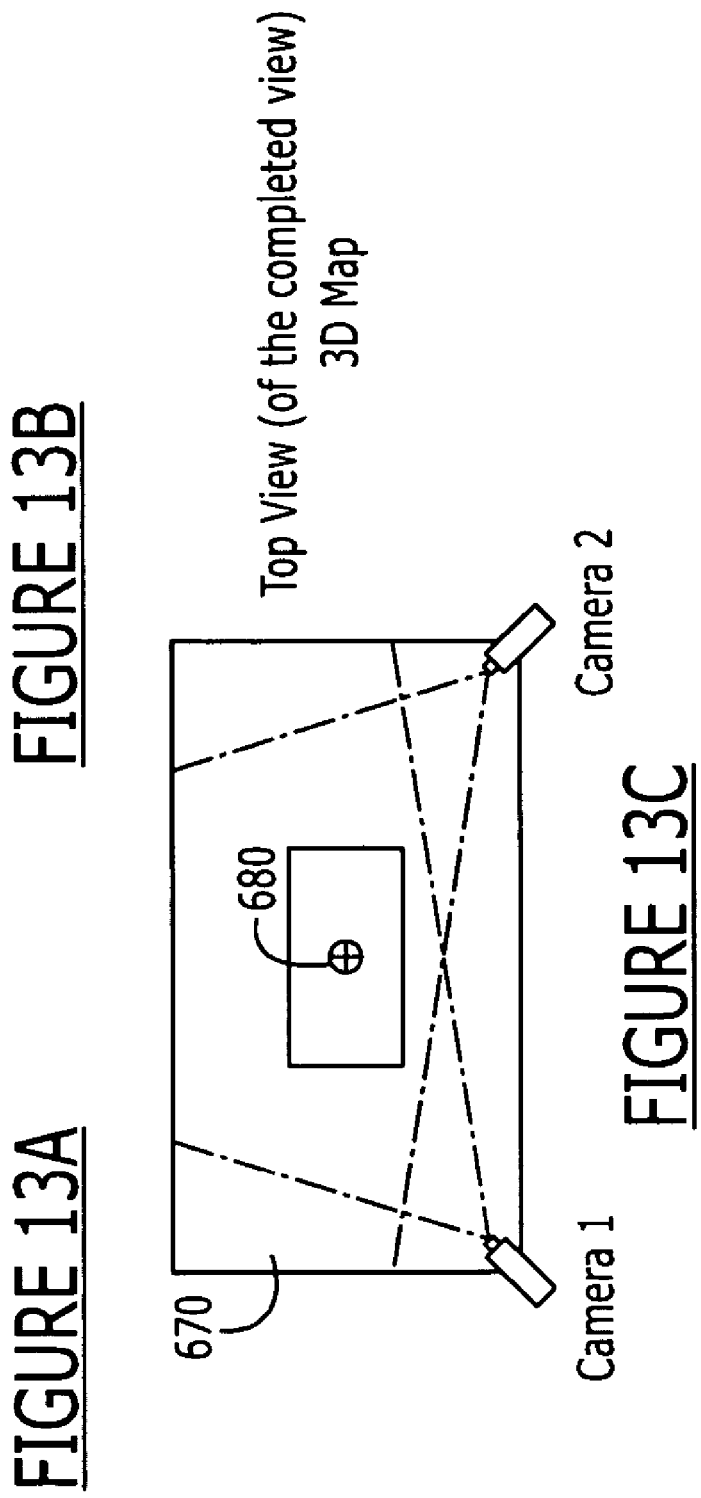
FIGURE 13A
FIGURE 13B
FIGURE 13C

SYSTEMS AND METHODS FOR MONITORING AND TRACKING MOVEMENT AND LOCATION OF SHIPPING CONTAINERS AND VEHICLES USING A VISION BASED SYSTEM

CROSS-REFERENCE TO RELATED APPLICATIONS

This application claims the benefit of U.S. Provisional Application No. 60/475,810, filed Jun. 4, 2003.

FIELD OF THE INVENTION

The present invention relates to tracking location of shipping objects, and more particularly to systems and methods for real time monitoring of the location of shipping objects at or about transit terminal using a vision based tracking system.

BACKGROUND OF THE INVENTION

The ability to track and locate shipping containers within a terminal, such as a marine, rail or intermodal terminal, is critical to the operation of the terminal. When containers are brought into a marine container terminal on a truck chassis, they are typically parked in a parking spot prior to being loaded on a ship/vessel for transport. The ability to find and load or move the correct container depends on knowing, in real-time, where the container has been parked, i.e., real-time knowledge of where the container is located within the terminal.

In a normal inbound operation, a truck brings a container into the terminal. The container is sitting on a truck chassis. Typically, once in the terminal, the truck parks and then unhooks from the chassis and its container. The container and chassis is left in a numbered parking spot, and the truck leaves the facility. In other instances, the containers are off-loaded from the chassis and appropriately stacked in the shipping terminal, these off-loaded containers are commonly referred to as being "grounded". Stacking containers, as opposed to parking a combined chassis and container, provides for greater space utilization in the shipping terminal.

In a normal outbound operation, a container is off-loaded from a vessel and placed on a chassis. The chassis with its container is pulled into a numbered parking spot and left to be picked up by an unloaded truck that comes on to the terminal to pick up a container. The truck is directed to the parking spot, hooks up to the chassis and pulls it off the terminal. In other instances, the containers will be off-loaded from the chassis and appropriately "grounded" or stacked.

Additionally, outside of normal inbound and outbound traffic the containers will occasionally be required to be moved about the terminal for various reasons. Trucks, cranes or other container handling equipment may be responsible for moving containers about the terminal. Each time a container is moved; its new location must be identified and recorded.

In almost all instances, the identification and recordation of shipping containers is done manually, using spotters who write down or enter the location into a computer terminal. As is the case with any process that involves manual input of data, a system that employs manual identification and recordation of shipping container location is plagued with errors. Additionally, the manual systems do not provide for real-time reporting of container location nor do they provide for automated direct entry of container location into the terminal's computerized operating system, referred to herein as the Terminal Operating System (TOS).

Recent developments in identifying and tracking shipping containers in a terminal setting have focused on systems that implement the use of mobile Optical Character Recognition (OCR) or Radio Frequency (RF) tagging. However, both of these types of systems are problematic. Mobile OCR only establishes location of the container after-the-fact, i.e., when the container has been parked. A system that employs RF tags is only viable if each and every container is augmented to include the tag. Invariably, such a system will be prone to fail because not all containers would be augmented with the RF tag and, as such, containers would enter the terminal that would be unidentifiable. In the same regard, the cost related to tagging each container makes such a system cost prohibitive. Additionally, since typical shipping terminals employ a high degree of ground level metal, (acting as a radio signal reflector), long or medium range RF identification becomes very problematic.

In addition to the problem of providing real-time location-identification for shipping containers at the terminal, current systems provide no automatic means to identify the container location on a vessel. While there is a fixed grid on each vessel: tier (height), cell (side to side), and bay (bow to stern), the grid is seen as relative to the dock and the grid moves as the vessel moves (with the tide and as the vessel raises or sinks with the subtraction or addition of containers). Therefore, it is difficult to get a fix on the vessel's grid.

While modem quay cranes used to load and unload vessels have a means for "knowing" or locating a container within their own frame of reference, it is difficult to match up the crane's frame of reference with the vessel's frame of reference. The crane is constantly moving, (gantry movement along the dock), so that it can get to a different bay. It is also critical to safe terminal operation to insure that vehicles and terminal personnel are not in harm's way at the landing zone (aptly referred to as the strike zone), which is the area directly below the quay crane. In most instances, unauthorized vehicles or personnel in the landing zone will trigger an alarm-notification or auto-shutdown of the quay crane operation.

In addition to locating containers on shipping vessels, another problem exists with triggering crane-mounted OCR systems, which are used to identify containers as they are placed on and removed from shipping vessels. Currently, crane-mounted OCR systems rely on the crane controller to signal the OCR system to capture images. More specifically, the OCR system relies on a system trigger, which is derived from data collected from the crane controller, to start/stop image capture. While some crane controllers have a means for providing the requisite positional data, other crane controllers are not equipped to provide this data. Even in the instance in which the crane controller is equipped to provide the positional data, many of the controllers do not readily allow for outside connection to the system or access to the data is cost-prohibitive. In addition, in many instances crane system warranties are invalidated if additional foreign equipment or devices are added to the crane system.

The crane controller's function is to run the motors, which provide for the hoist and trolley movement of the container lifting device (commonly referred to in the industry as the headblock or spreader). In certain embodiments the controller has an external data connection, through a Program Logic Controller (PLC). This connection allows for transmission, via Ethernet, wireless, serial or the like, of hoist and trolley data to a separate, non-crane computer. In order for the controller to transmit the required data to the OCR system or any other external system, it must be equipped with software that generates or collects the needed data and sends it to the PLC or other module for outside access. In certain other embodiments the controller is not readily equipped with a means for external data connection.

The OCR computer(s) use the position data to "know" when the hoisted container is in position for good OCR images. It can then begin to capture images for OCR processing. The OCR computer(s) also use the position data to control the selection, focus, and zoom of the OCR imaging devices. In this way the correct imaging device is selected and the correct zoom and focus is applied to get a good image of the container marking.

The need exists to develop a container location-identification and tracking system that characteristically has a low error rate, is economical to implement and provides real-time data. As such, the desired system will not require the shipping containers to be augmented or retrofitted with any tracking device. Additionally, the ideal system will automatically merge data with a container identification system, such as currently employed OCR based identification systems and automatically provide real-time location-identification data to the corresponding TOS. In addition, the desired system will be capable of providing detection and location-identification to containers that are either loaded on chassis (i.e., "wheeled") or "grounded". The desired system will also provide the ability to identify the location of the shipping container onboard the vessel.

Additionally a need exists to develop a means for triggering a crane-mounted OCR system. The desired triggering mechanism should be independent of the crane controller and provide a trigger system that will work on any crane, regardless of whether the controller is equipped with an external communication means. In addition, the desired trigger system should generate a trigger as the crane moves the container through the normal container path, off or on the vessel.

SUMMARY OF THE INVENTION

The present invention provides for systems and methods for tracking and locating shipping objects, such as containers, chassis and vehicles at transit terminals using an automated vision-based tracking system. The transit terminal may be an automotive terminal, a marine vessel terminal, a rail terminal an intermodal terminal or any other transit terminal. Such a system is ideally suited to provide minimal error rates, low cost implementation, real-time data and automatic merging of data with corresponding container identification systems and terminal operating systems. The systems and methods of the present invention provide for location-tracking of containers without the need to retrofit containers with a tagging or marker device. The vision-based system incorporates the use of multiple imaging devices and a hand-off method for tracking the location of the containers over extended distances.

In one embodiment of the invention a vision-based tracking system is used by provide real-time location-identification of shipping containers at a terminal and within associated terminal vessels. In alternate embodiments the vision-based tracking system is implemented in conjunction with a container identification system, such as an OCR system. The OCR system provides the means to identify the container and the vision based tracking system provides the means to track the container as it is moved and parked within the terminal or on the vessel.

The typically system will incorporate an array of imaging devices disposed at various predetermined locations within the terminal yard and corresponding to a position on an overall imaging device grid array. The vision-based system is capable of handing-off the tracking task from one computer to another as the vehicle or container moves from one imaging device's field of view to another imaging device's field of view. The vision/tracking system "watches" or detects the container as the container moves thru the entry OCR gate and obtains the OCR identification information from the OCR system. This identifying information is then used by the vision-based tracking system to identify the container as it is moved about the terminal yard. Additional OCR input points can include stations associated with container handling equipment, such as top picks, side picks, transfer crane, quay cranes and the like. The vision-based tracking system provides the capability to detect which pedestal that a vehicle and/or container comes in contact with, after passing thru the initial OCR entry gate.

In one specific embodiment a system for monitoring the movement of objects, such as shipping containers, vehicles and/or vehicle chassis, in a transit terminal is defined. The system includes multiple imaging devices, such as video cameras, positioned about the transit terminal such that a positioning of the imaging devices provides for a continuous field of view for an object that moves throughout any area of the transit terminal. Additionally the system provides for one or more object monitoring and tracking hosts in communication with one or more of the plurality of imaging devices, the hosts having a processor that executes a vision-based scene analysis routine to monitor, in real-time, the movement of objects in the transit terminal. The transit terminal may be an automotive terminal, a rail terminal a marine vessel terminal, an intermodal terminal or the like. Communication between the imaging devices and the host, as well as all other communication herein referred to, may be wired or wireless communication.

The imaging devices will typically be positioned in a two or three-dimensional array to provide the requisite continuous field of view to the entire area of the transit terminal. In one embodiment the array is formed of multiple imaging devices positioned about numerous poles so as to provide 360 degree field of view to a specific area of the transit terminal. Each imaging device or, more typically, each imaging device at a pole station is in communication with an individual object monitoring and tracking host. In one embodiment the system may further include a central tracking server that is in communication with all of the hosts. The server will include a processor that executes a correlation routine to track objects as they move from the field of view of the imaging devices controlled by a first host to the field of view of the imaging devices controlled by a second host. In other words, the central host provides for the correlation routine to "hand-off" the tracking of an object from host to host.

The system may further include an Optical Character Recognition (OCR) identifying system that is in communication with the hosts and/or the central tracking server. The OCR identifies the objects upon entrance to the transit terminal and provides the scene analysis routine and/or the correlation routine with object identifying information. The communication between the OCR and the hosts/server may be through an intermediary network, such as a Local Area Network (LAN), or the like. The network interface may also provide for a communication link between the hosts and/or server and a Terminal Operating System (TOS). Typically, information from the vision based tracking system is communicated to the TOS to manage the location and movement of containers, vehicles and chassis throughout the terminal.

In an alternate embodiment of the invention a system for identifying and monitoring the movement of objects, such as containers, vehicles and/or chassis, at a transit terminal is defined. The system includes an Optical Character Recognition (OCR) identifying system that identifies objects and a vision-based tracking system in communication with the OCR system that tracks, in real-time, the location of the objects that have been identified by the OCR identifying system.

The vision based tracking system will typically include an array of imaging devices positioned about the transit terminal that are in communication with the vision-based tracking system and provide the vision-based tracking system with real-time images of the tracked objects. The vision-based tracking system will typically include one or more scene analysis routines implemented by multiple object monitoring and tracking hosts. The scene analysis routine(s) track the location of the objects throughout a predefined area of the transit terminal. The vision-based tracking system may additionally include a correlation routine implemented by a central tracking server that is in communication with the multiple object monitoring and tracking hosts. The correlation routine provides for tracking the location of the objects throughout the entire transit terminal, in this regard the correlation routine provides for objects to be tracked from one host to another host in the system.

The OCR identifying system and the vision-based tracking system are typically in communication with a Terminal Operating System (TOS) that manages the transit terminal based on object identifying information provided by the OCR identifying system and object location information provided by the vision-based tracking system.

The invention is also defined by various methods for identifying and tracking the movement of objects, such as shipping containers, chassis and/or vehicles, at a transit terminal. The transit terminal may be an automotive terminal, a marine vessel terminal, a rail terminal, an intermodal terminal or the like. In one embodiment the method includes the steps of identifying a transit terminal-related object proximate an entry point of the transit terminal and communicating object identification information to a Terminal Operating System (TOS). These steps are typically accomplished by an OCR identifying system or some other form of object identification. The method additionally includes the steps of providing object image data to a vision-based tracking system, implementing a scene analysis routine within the vision-based tracking system and communicating scene analysis routine data to the TOS for managing the object at the transit terminal.

The method may additionally include the step of identifying a form or action of the object upon providing the object image data to the vision-based tracking system. The form may include a container, a chassis, a vehicle or the like. The action may include hooking/unhooking a chassis from a vehicle, removing or adding a container from/to a chassis, moving a container about the transit terminal and the like.

The invention is additionally embodied in a method for monitoring vehicles at a staging area in a transit terminal. The method includes the steps of monitoring at a transit terminal, with one or more imaging devices, one or more vehicle pedestals and a queuing area associated with the pedestals, providing image data from the pedestals and the queuing area to a vision-based monitoring system, and managing the vehicle pedestals and the queuing area based on the image data provided to the vision-based monitoring system. In this regard, the step of managing the vehicle pedestals and the queuing area based on the image data provided to the vision-based monitoring system may further include the sub steps of (a) redirecting vehicles in the queuing area based on the image data provided to the vision-based monitoring system, (b) assessing the number of vehicles at the pedestals and in the queuing area based on the image data provided to the vision-based monitoring system, (c) characterizing the vehicles at the pedestals and in the queuing area based on the image data provided to the vision-based monitoring system, (d) measuring the speed of travel of the vehicles based on the image data provided to the vision-based monitoring system and/or (e) detecting direction of movement of a vehicle based on the image data provided to the vision-based monitoring system.

Additionally, the invention is embodied in a system for monitoring vehicles at a staging area in a transit terminal. The system includes multiple imaging devices positioned about the staging area in a transit terminal. The imaging devices will provide for a continuous field of view for an object that moves through a queuing area and a pedestal area associated with the staging area. The system additionally includes one or more object monitoring and tracking hosts in communication with multiple imaging devices. The hosts include a processor that executes a vision-based scene analysis routine to monitor, in real-time, objects in the staging area. The transit terminal may consist of an automotive terminal, a rail terminal, a marine terminal, an intermodal terminal or the like. The system may further include a central tracking server in communication with the one or more object monitoring and tracking hosts. The server will include a processor that executes a correlation routine to track objects as they move from the field of view of one or more of the imaging devices controlled by a first host to the field of view of one or more of the imaging devices controlled by a second host. The system may additionally include an Optical Character Recognition (OCR) identifying system and/or a Terminal Operating System in communication with the hosts and/or the central server. The OCR system identifies the vehicles upon entrance to an OCR portal and the TOS manages the objects based on communicated data from the vision-based scene analysis routine.

The invention is also defined by a method for real-time monitoring of storage of a transit container at a transit terminal. The method comprising the steps of providing for multiple imaging devices to monitor a transit container storage area, providing real-time image data from the imaging devices to a vision-based monitoring system, and managing the containers in the storage area based on the image data provided to the vision-based monitoring system. In one specific embodiment the step of providing for multiple imaging devices to monitor a transit container storage area is further defined as providing multiple imaging devices proximate a shipping vessel, typically affixed to a quay crane, that monitor a storage area within the shipping vessel. The step of managing the containers in the storage area based on the image data provided to the vision-based monitoring system may further defined as managing change in storage locations for the containers.

The invention is also embodied in a system for real-time monitoring of the storage of a transit container at a transit terminal. The system includes multiple imaging devices positioned proximate a container storage area such that the imaging devices provide for a continuous field of view for all of the containers stored in the storage area and one or more object monitoring and tracking hosts in communication with the one or more imaging devices. The hosts include a processor that executes a vision-based scene analysis routine to monitor, in real-time, containers in the storage area. In one embodiment the imaging devices are positioned on a quay crane that is positioned proximate a container storage area located on a shipping vessel. The system may additionally include a central tracking server in communication with the multiple object monitoring and tracking hosts. The server includes a processor that executes a correlation routine to track objects as they move from the field of view of imaging devices controlled by a first host to the field of view of imaging devices controlled by a second host. The system may additionally include a Terminal Operating System (TOS) and/or an OCR identifying system in communication with the hosts and/or the server.

Another embodiment of the invention is defined by a method for real-time monitoring of an area proximate a landing area associated with a quay crane. The method includes the steps of providing for one or more imaging devices to monitor a landing area associated with a quay crane, providing real-time image data from the imaging devices to a vision-based monitoring system and managing the landing area associated with the quay crane based on the image data provided to the vision-based monitoring system. The method will typically additionally include the step of providing an alarm if hazardous conditions exist in the landing area.

As such the present invention provides for systems and methods for location-identification and monitoring of objects, such as shipping containers, at a transit terminal using an automated vision based tracking system. The transit terminal may be an automotive terminal, a marine terminal, a rail terminal an intermodal terminal or the like. Such a system is ideally suited to provide minimal error rates, low cost implementation, real-time data and automatic merging of data with corresponding object identification systems and terminal operating systems. The systems and methods of the present invention provide for location-tracking of objects without the need to retrofit the objects with a tagging or marker device. The vision-based system incorporates the use of multiple imaging devices and a hand-off method for tracking the location of the objects over extended distances.

BRIEF DESCRIPTION OF THE DRAWINGS

Figure 1:
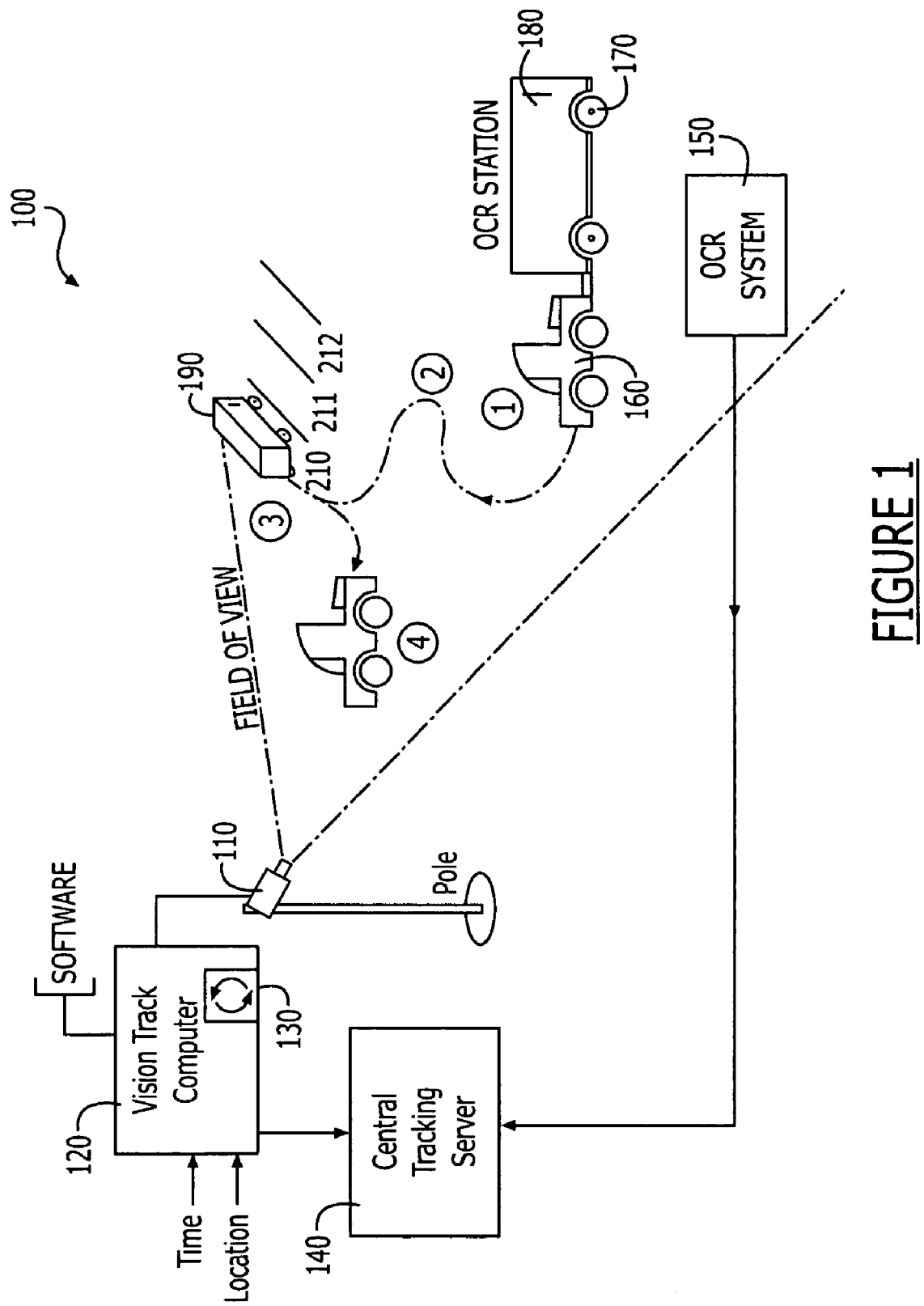

Having thus described the invention in general terms, reference will now be made to the accompanying drawings, which are not necessarily drawn to scale, and wherein:

FIG. 1 is a schematic illustration of a system for vision-based, location-tracking of objects in a transit terminal environment, in accordance with an embodiment of the present invention.

Figure 1A:
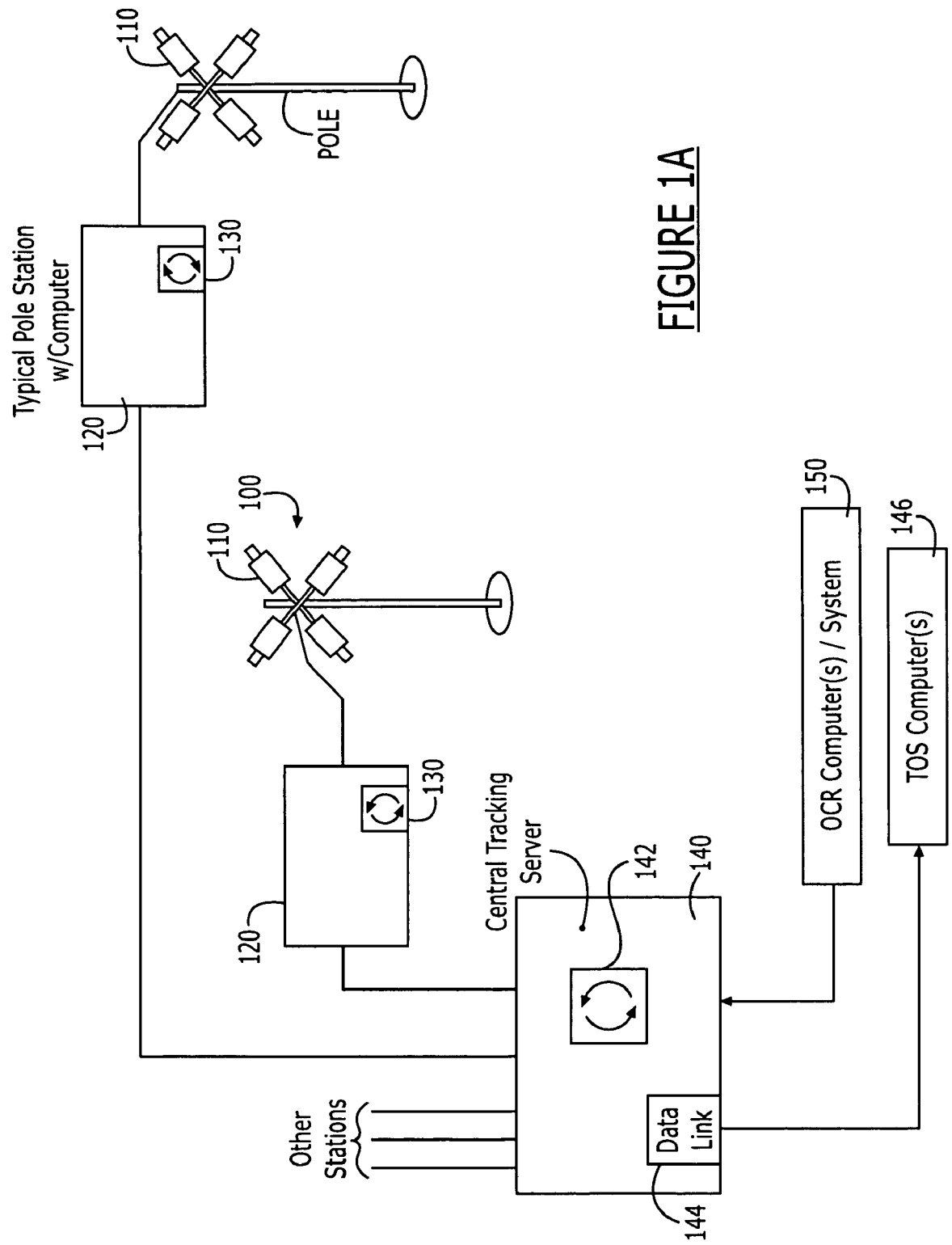

FIG. 1A a schematic diagram of a system for vision-based location-tracking of objects a transit terminal implementing a central server, in accordance with an embodiment of the present invention.

Figure 2:
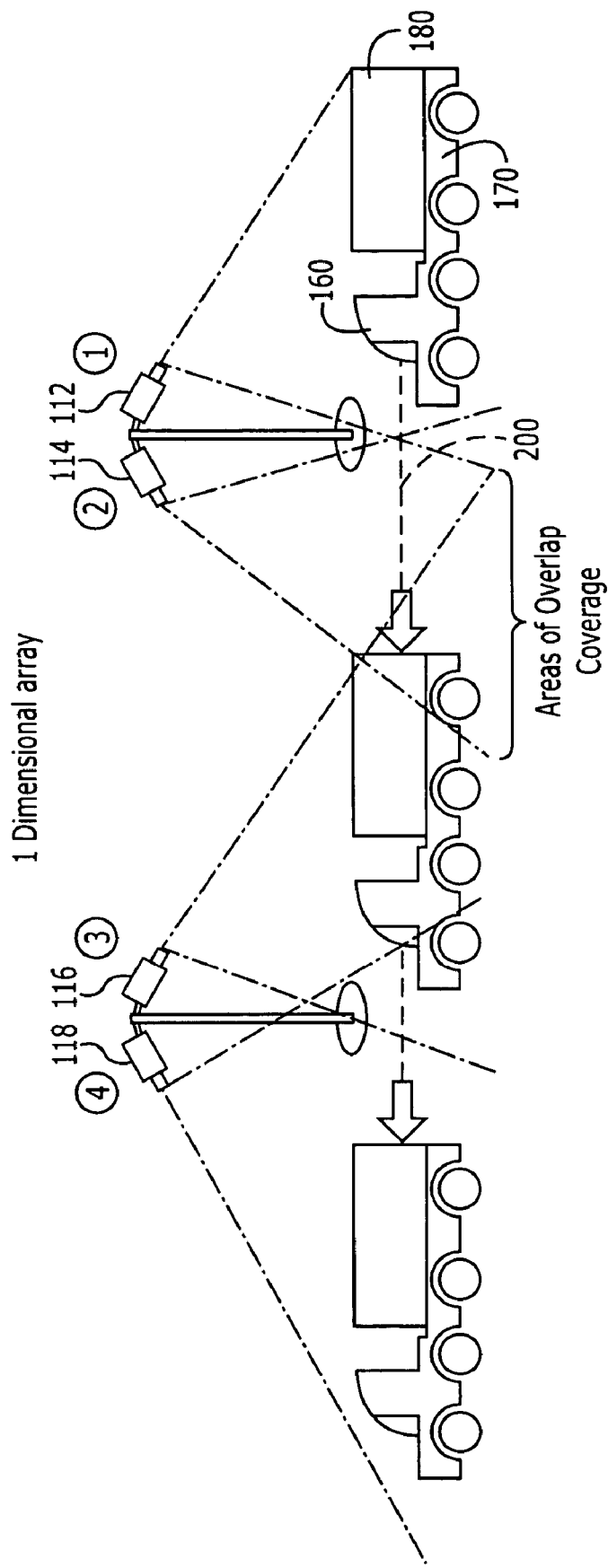

FIG. 2 is a schematic illustration of a multiple imaging device system for vision-based, location-tracking of containers, in accordance with an embodiment of the present invention.

Figure 3:
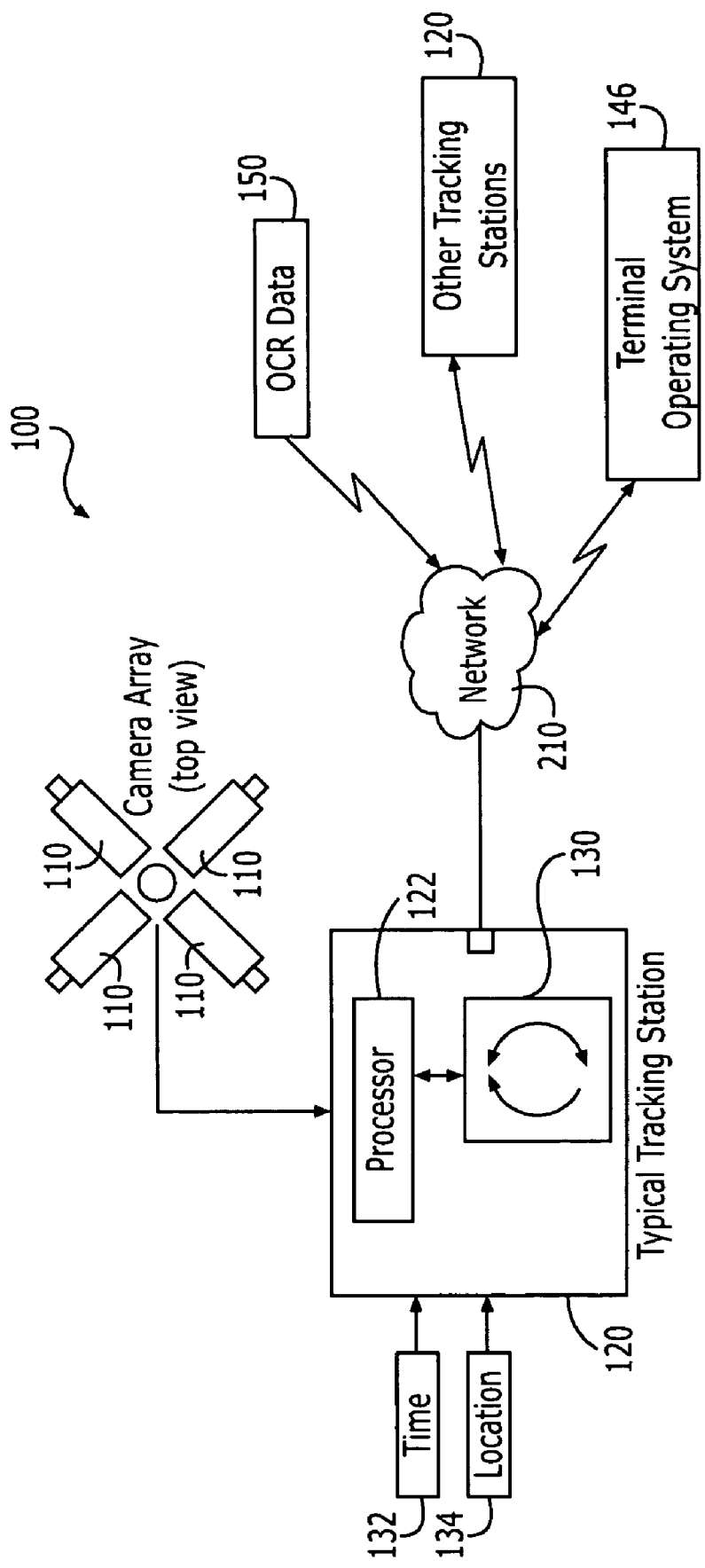

FIG. 3 is a block diagram of a composite system for vision-based, location-tracking of containers implemented in conjunction with a container identification system and a terminal operating system, in accordance with an embodiment of the present invention.

Figure 4A:
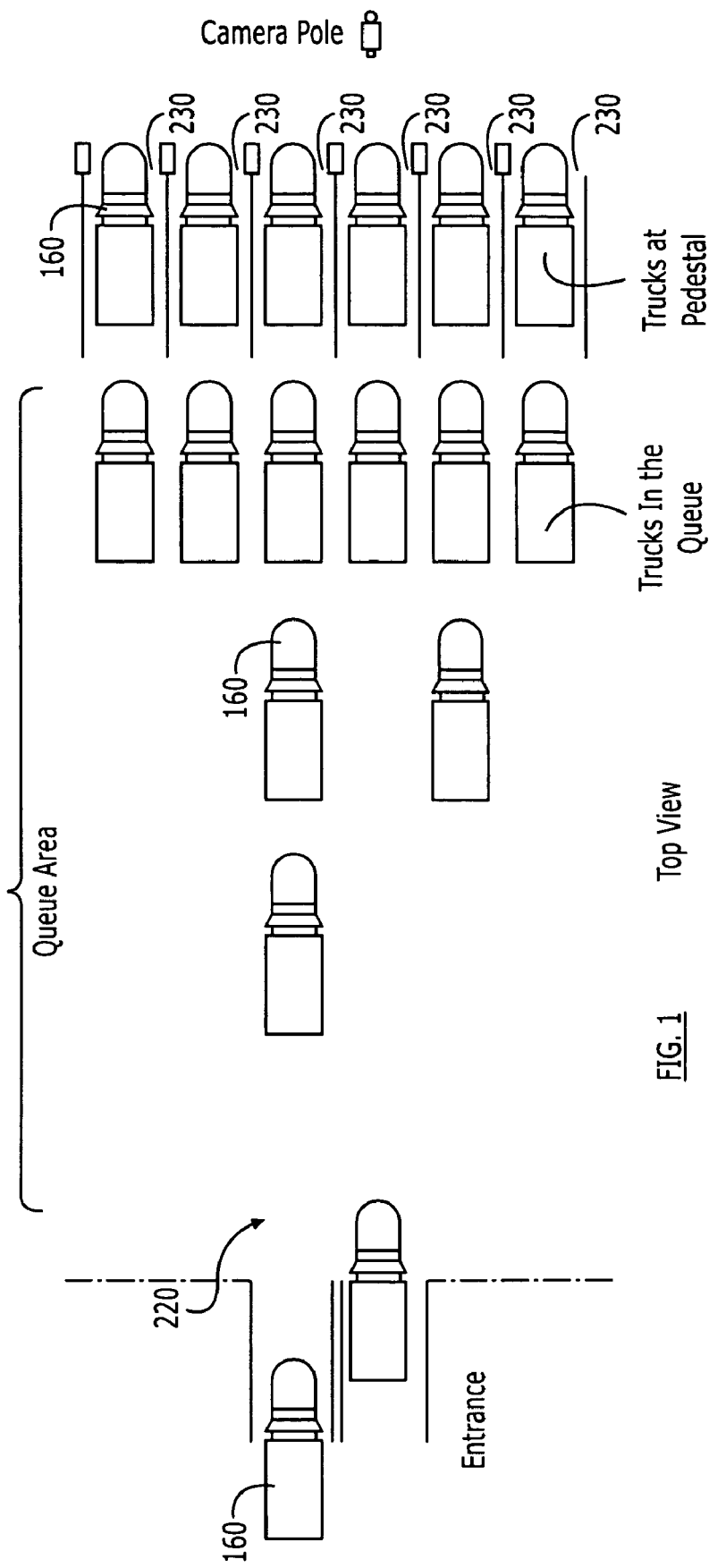
Figure 4B:
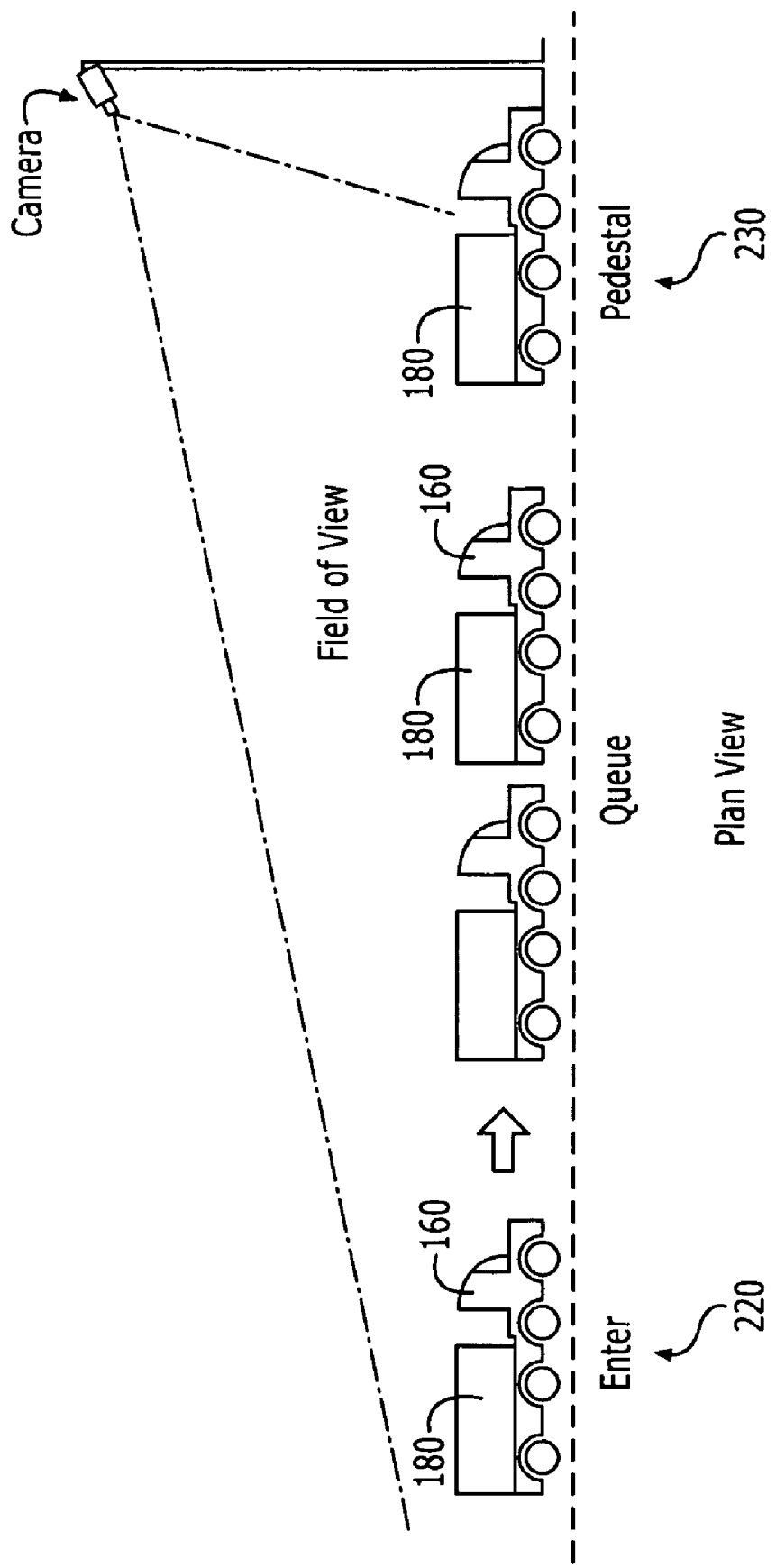

FIGS. 4A and 4B are top-view and plan view schematic diagrams of vehicles entering a shipping terminal and the implementation of a vision-based, vehicle monitoring system, in accordance with an embodiment of the present invention.

Figure 5:
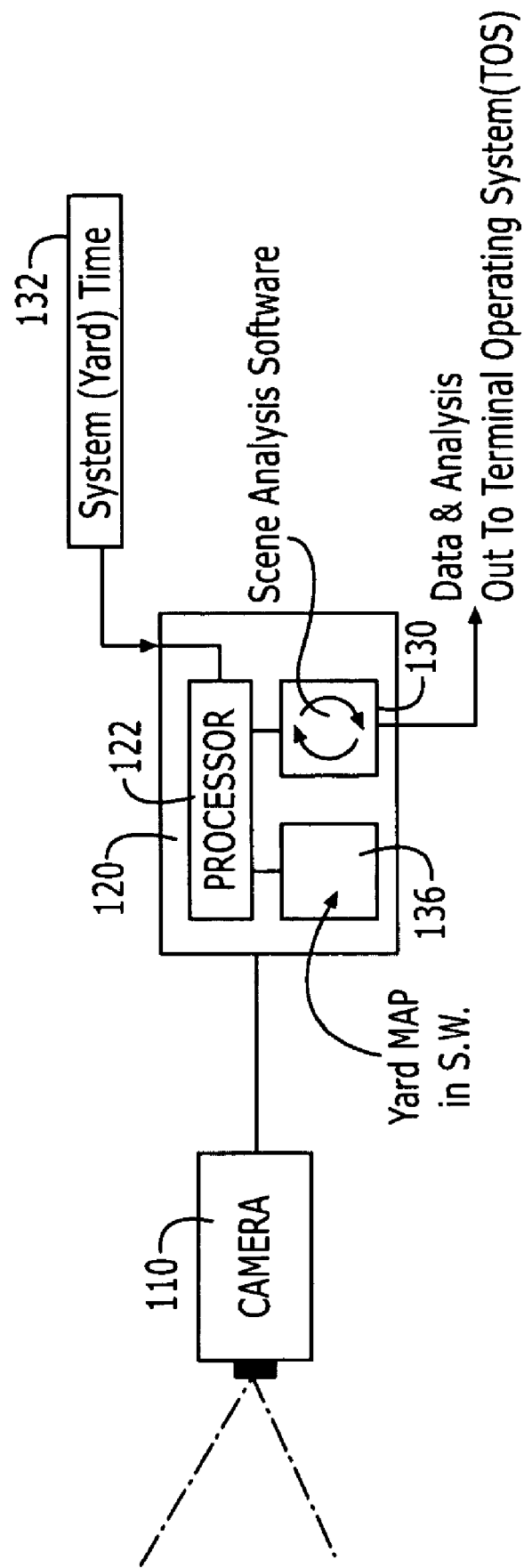

FIG. 5 is a block diagram of a composite system for vision-based, vehicle monitoring at queuing or staging areas, in accordance with an embodiment of the present invention.

Figure 5A:
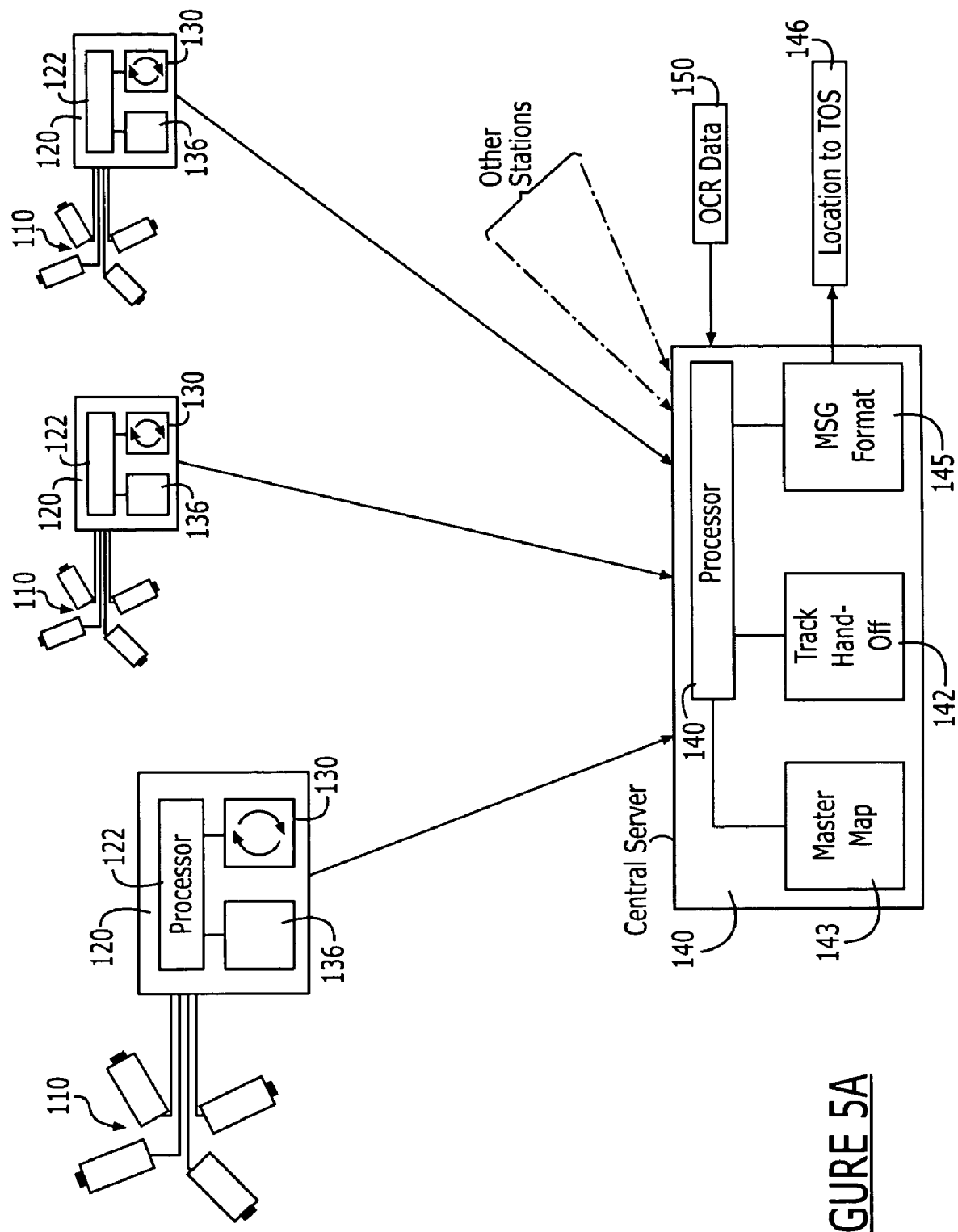

FIG. 5A provides a block diagram of a composite system for vision-based monitoring at a transit terminal that implements a central tracking server, in accordance with an embodiment of the present invention.

Figure 6A:
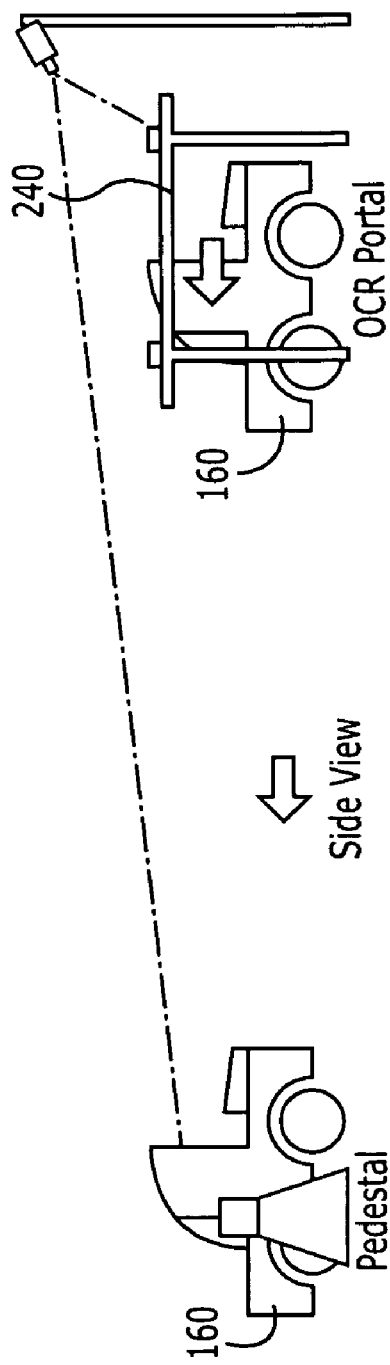
Figure 6B:
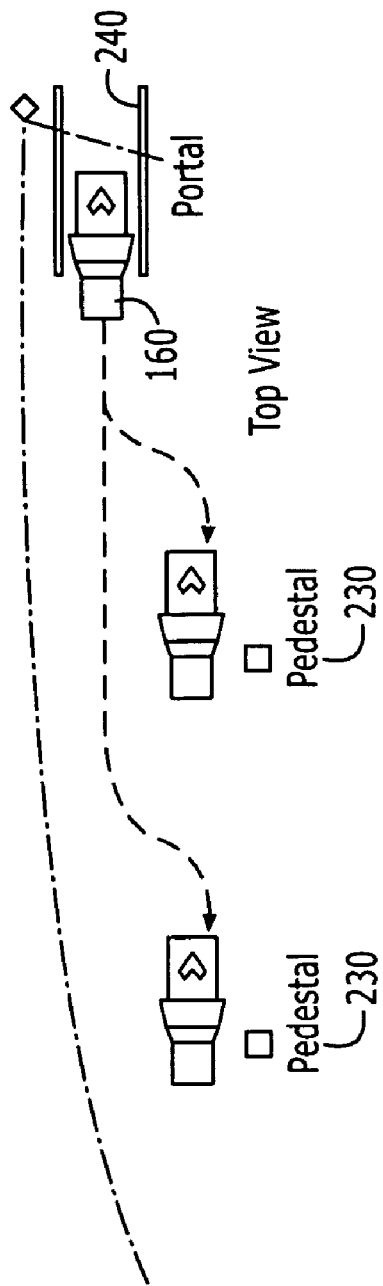

FIGS. 6A and 6B are side-view and top-view schematic drawings of vehicles being tracked in a terminal environment by vision-based tracking, in accordance with an embodiment of the present invention.

Figure 7:
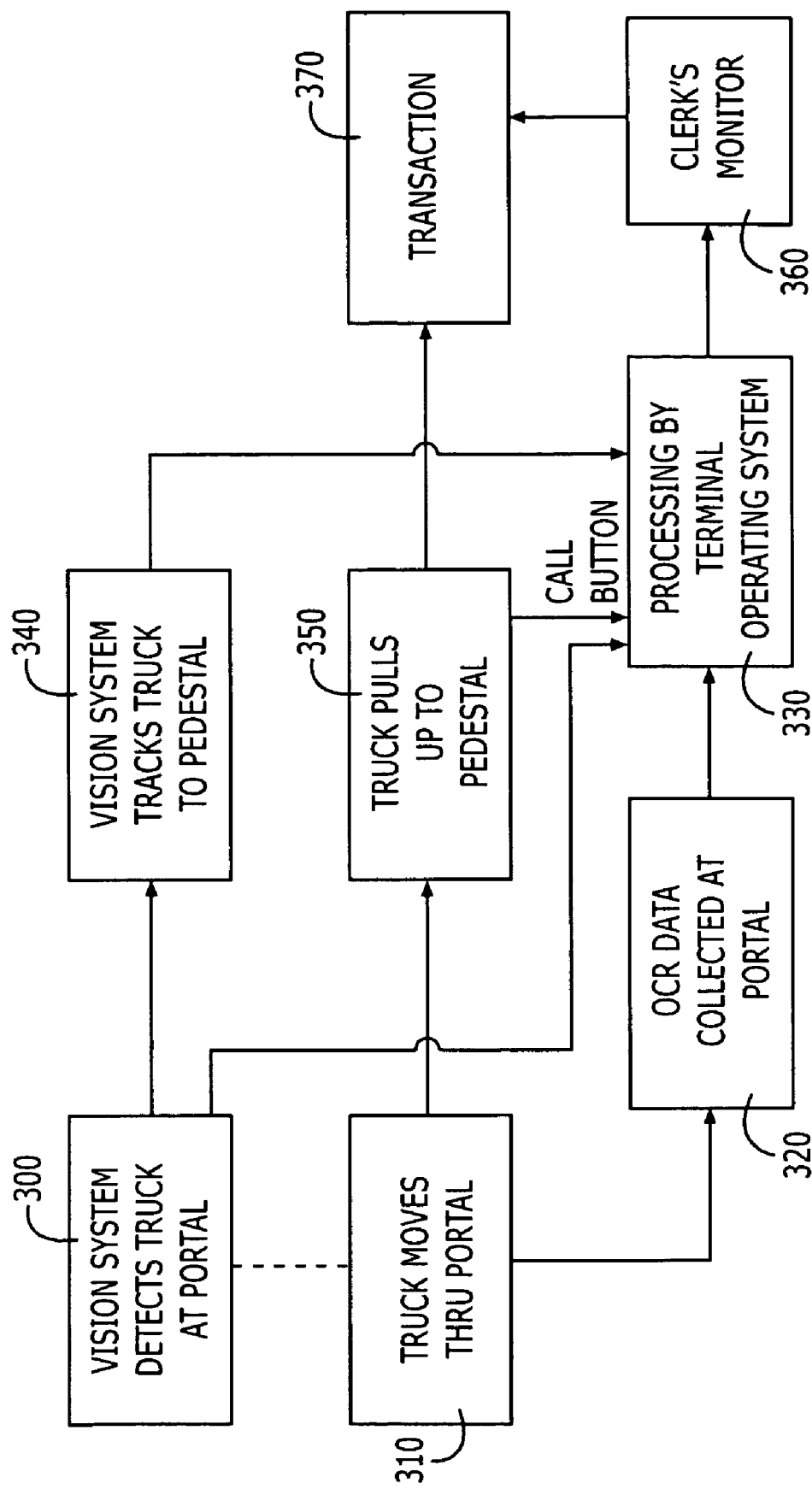

FIG. 7 is a flow diagram of a method for tracking the location of a vehicle and container at a terminal using vision-based tracking, in accordance with an embodiment of the present invention.

Figure 8:
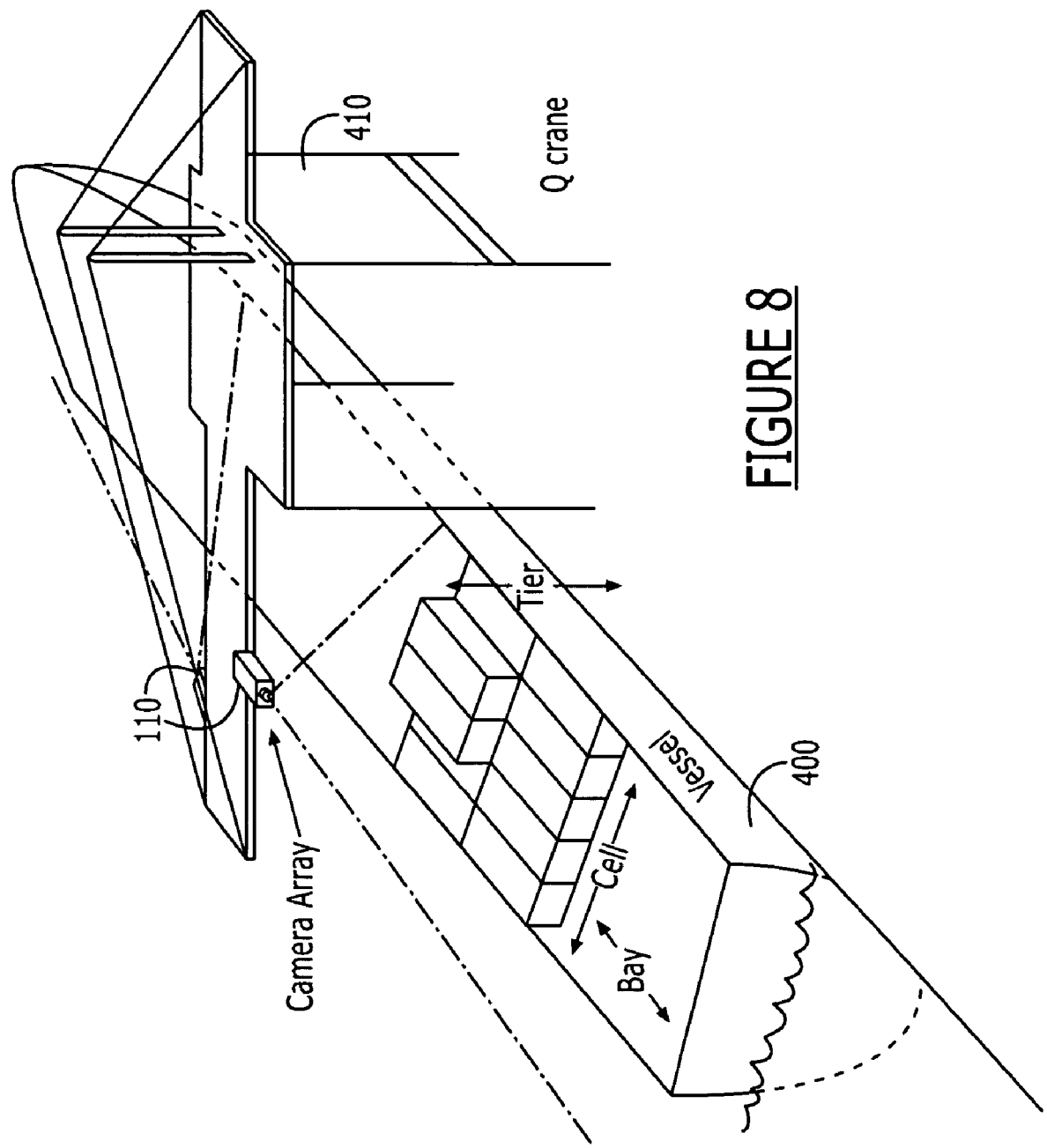

FIG. 8 is a schematic diagram of a system for location-identification of containers located on a shipping vessel, in accordance with an embodiment of the present invention.

Figure 9:
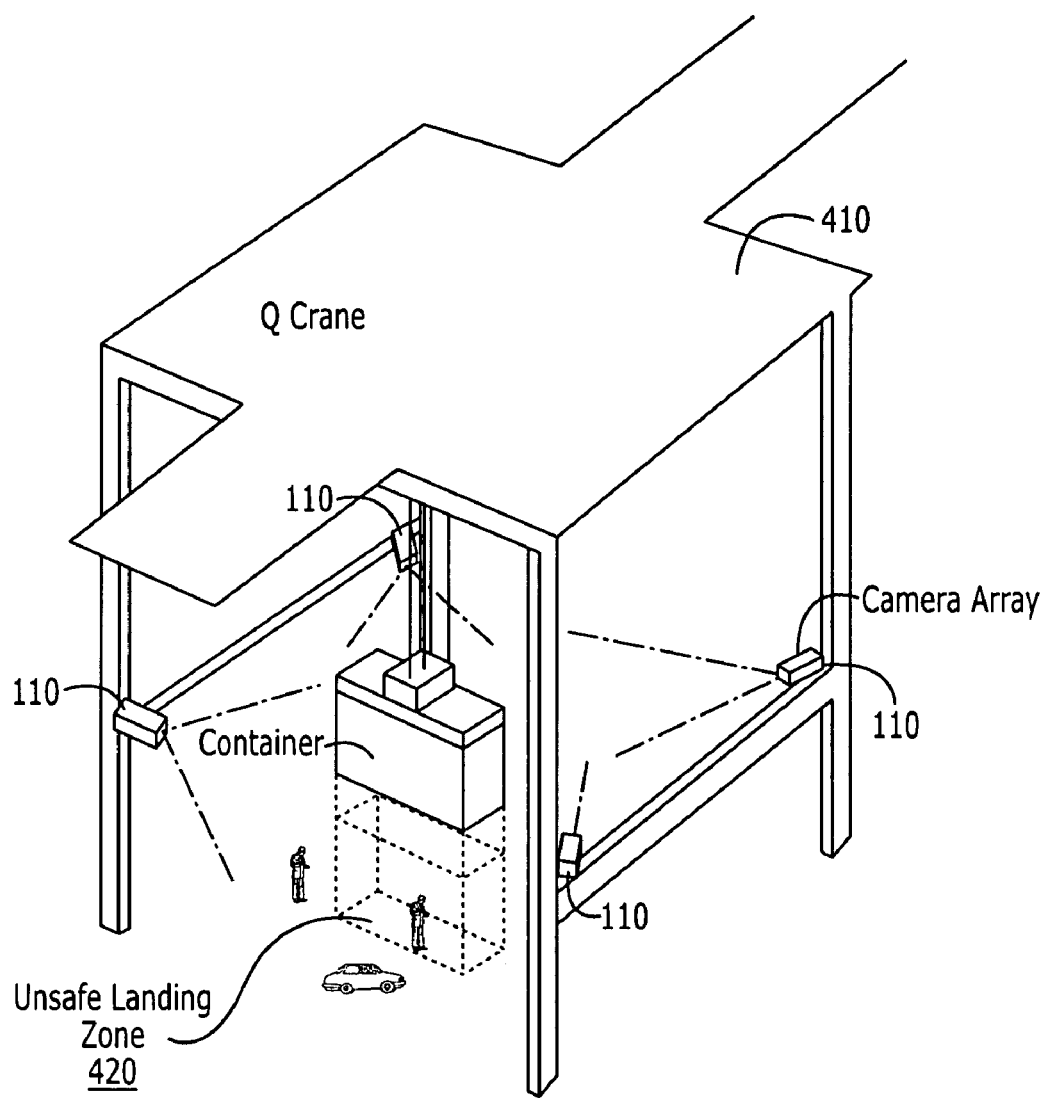

FIG. 9 is a schematic representation of a vision-based tracking system implemented to monitor activity in the landing area associated with a quay crane, in accordance with an embodiment of the present invention.

Figure 10:
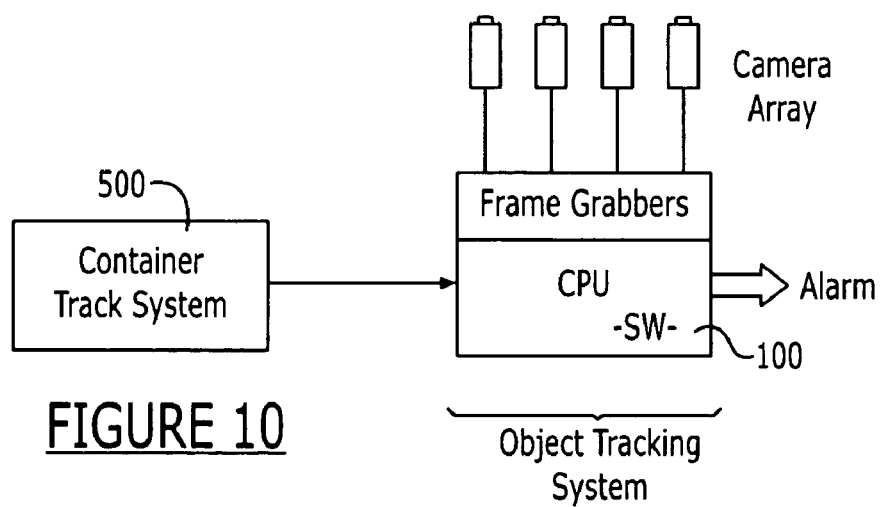

FIG. 10 is a block diagram illustrating the system for monitoring landing zone activity associated with a quay crane, in accordance with an embodiment of the present invention.

Figure 11:
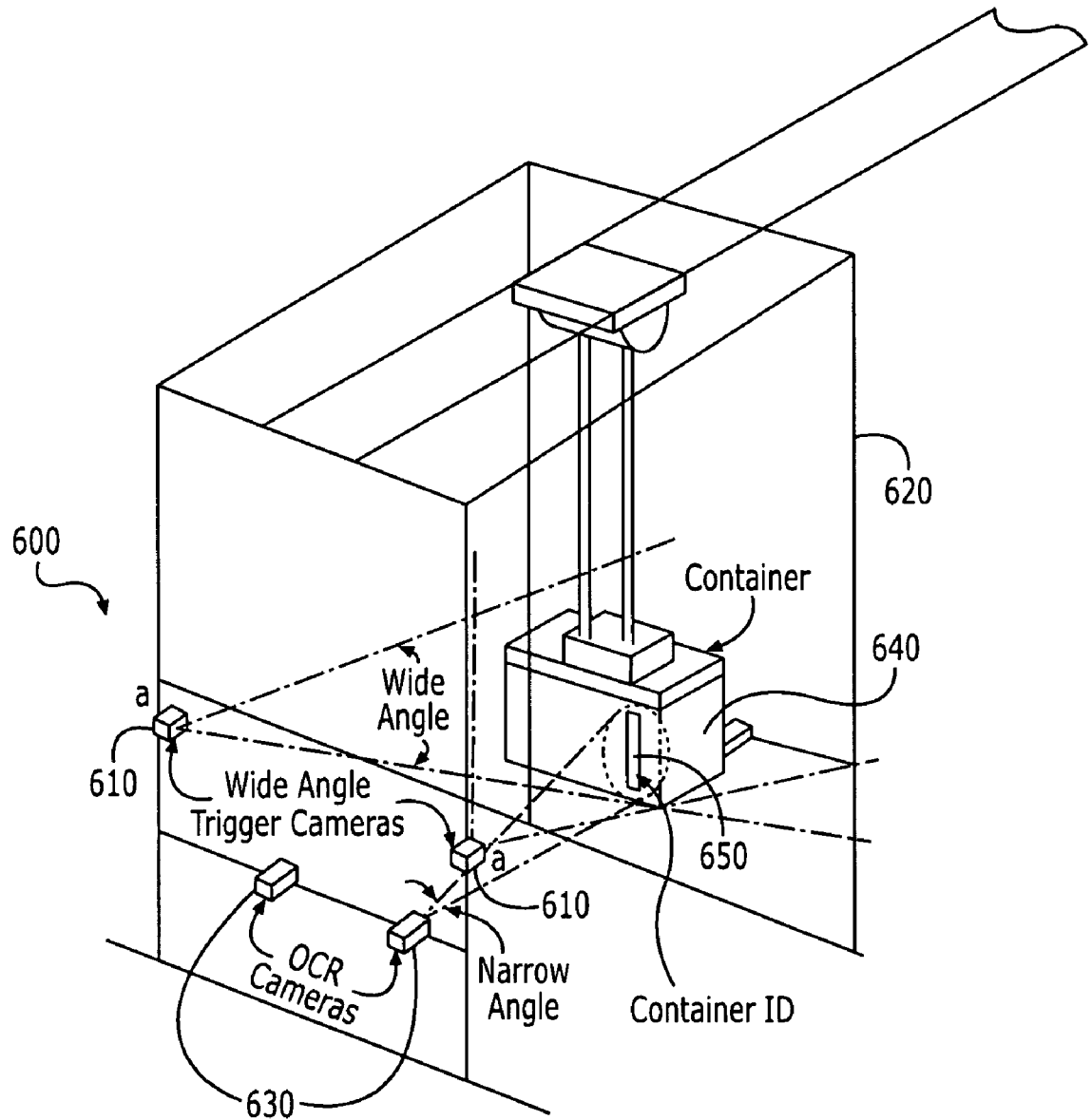

FIG. 11 is a perspective view of a system for triggering crane-mounted OCR, in accordance with an embodiment of the present invention.

Figure 12:
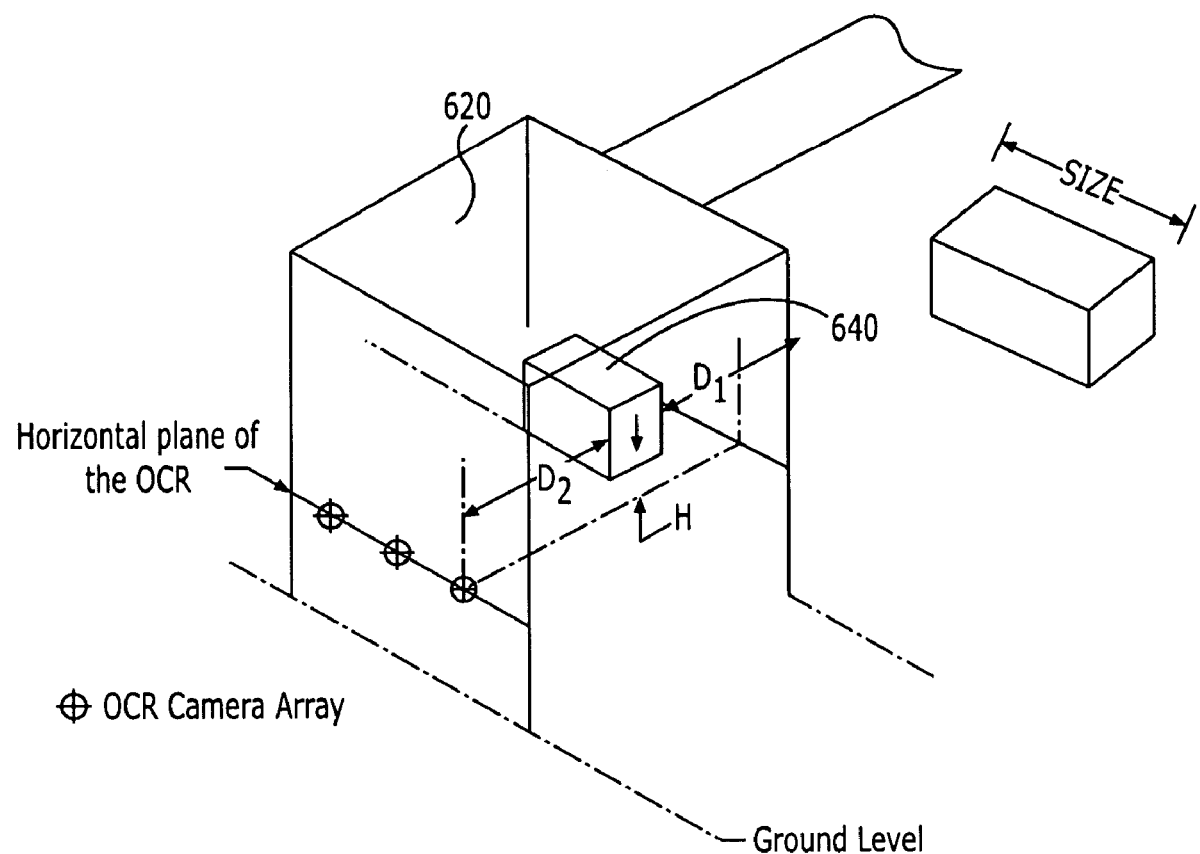

FIG. 12 provides a perspective view of the crane and the container and highlights the requisite parameters required to trigger the OCR system, in accordance with an embodiment of the present invention.

FIGS. 13A and 13B illustrate an example of container images and as captured by two separate triggering imaging devices, in accordance with an embodiment of the present invention.

FIG. 13C illustrates an example of a horizontal view image of the combined triggering imaging device images, in accordance with an embodiment of the present invention.

Figure 14:
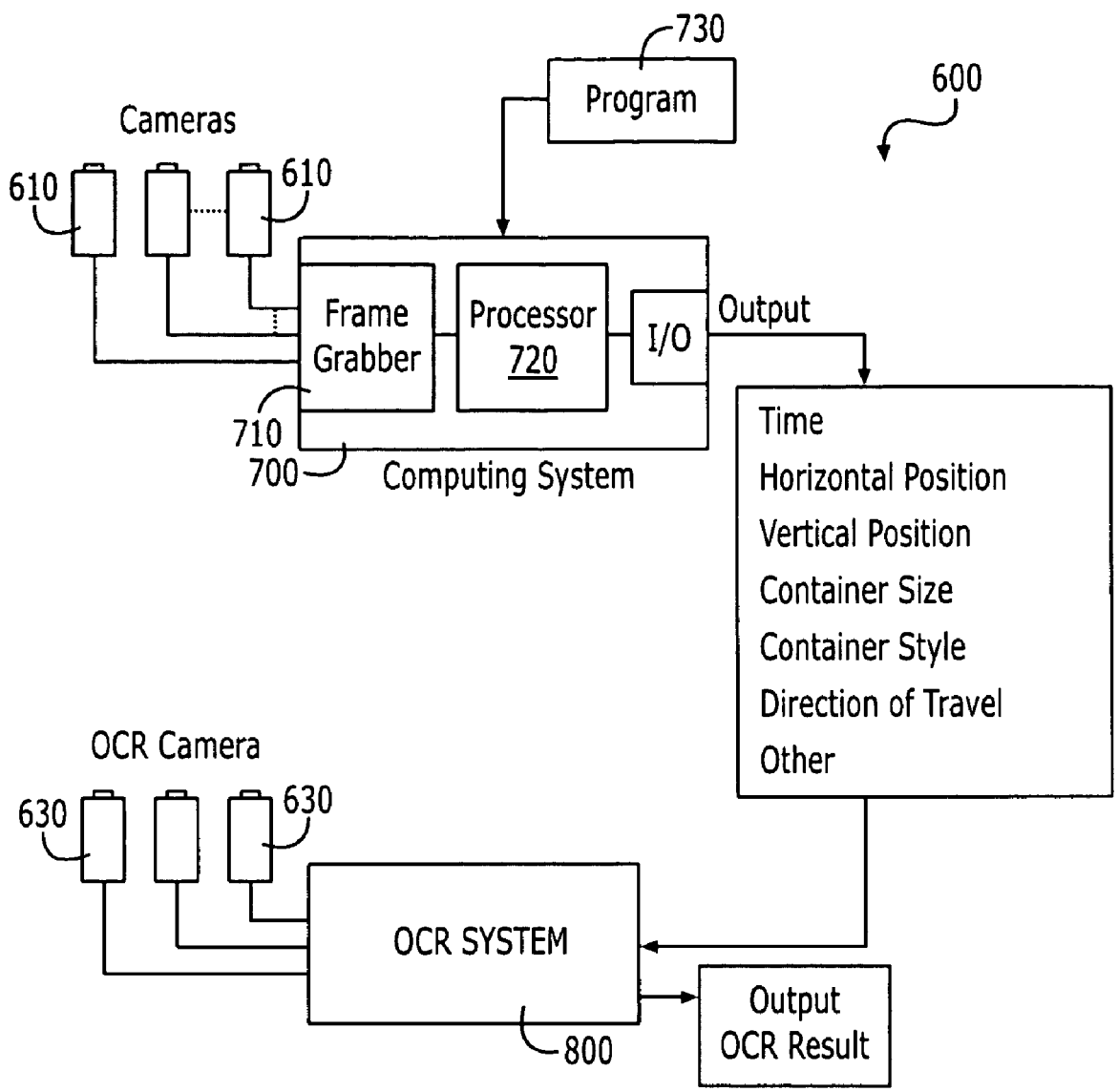

FIG. 14 is a block diagram of the trigger system and the OCR system, in accordance with an embodiment of the present invention.

Figure 15:
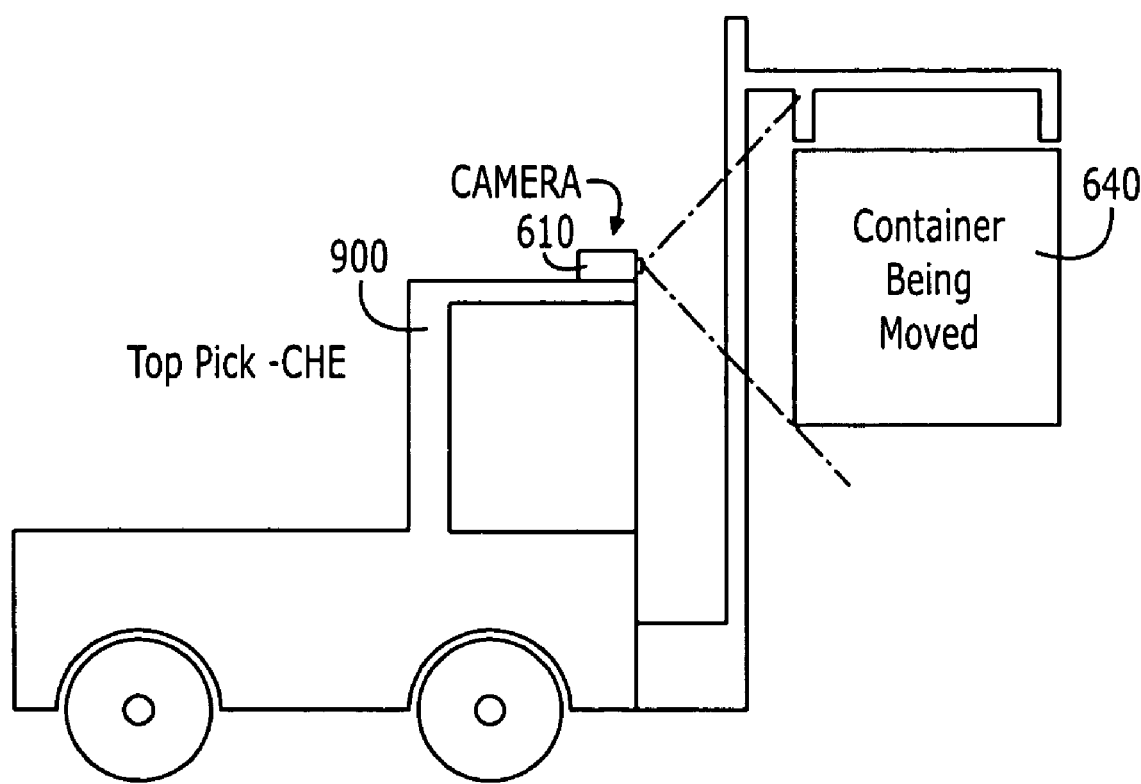

FIG. 15 depicts a schematic drawing of a top pick, container handler equipped with a vision-based OCR triggering system, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a schematic diagram of a system for vision-based, location-tracking of movable objects, such as vehicles, containers and/or chassis in a transit terminal environment, in accordance with an embodiment of the present invention. The transit terminal may be an automotive terminal, a marine vessel terminal, a rail terminal, an intermodal terminal or any other transit terminal. The vision-based, location-tracking system 100 includes one or more, imaging devices 110 typically positioned at predetermined locations throughout a transit terminal to provide for a continuous field of view of the area of the terminal. Typically a plurality of imaging devices will be implemented such that a grid-like, array formation of imaging devices provide for fields of view to the entire area of the transit terminal. The imaging devices 110 are in data communication with a vision-based tracking host 120 that implements a vision-based scene analysis routine 130. Typically, each imaging device or each series of pole station imaging devices will be associated with an individual vision-based tracking host. In the embodiment depicted in FIG. 1, the vision-based tracking host is in communication with the central tacking server 140 which correlates information from multiple hosts and subsequently communicates the correlated information to a Terminal Operating System (TOS) (not shown in FIG. 1), such that location-identification information from the vision-based tracking system is communicated to the TOS. In alternate embodiments, in which the vision-based tracking host is the only host in the system, the need for a central tracking server is obviated and communication between the vision-based tracking host and the TOS is direct.

In various embodiments of the invention the vision-based, location-tracking system will be implemented in conjunction with a container identification system, such as Optical Character Recognition (OCR) system 150. The OCR system is in communication with the vision-based tracking host 120 and provides vehicle and container identification information to the vision-based scene analysis routine 130. Additionally, the OCR system may be in communication with the central tracking server 140 for the purpose of providing identifying information to the correlation process that occurs at the server.

The system is typically implemented in the following fashion. A vehicle 160 having an associated chassis 170 and container 180 enters the terminal and may encounter the OCR system 150. The OCR identification system may be implemented at a drive-thru portal station or a pedestal station at which the vehicle temporarily docks at the station. The vision-based, location-tracking system detects and identifies the vehicle, the chassis and/or the container at the OCR station and provides the capability to identify the vehicle as a vehicle, the container as a container and the chassis as a chassis. The OCR system provides the capability to optically read the vehicle number, the container number and/or the chassis number. The number(s) are communicated to the vision-based tracking system which links the vehicle number, container number and/or chassis number with the image of the vehicle, the container and/or the chassis.

Once the identification information is linked with the vision-based, location-tracking system, the images of the truck, chassis and container have an identity. As the truck, chassis and/or container moves through the terminal confines, the vision-based, location-tracking system "watches" the movement of the identified truck, chassis and/or container. The movement of the object becomes a series of co-ordinates in the yard map maintained in the vision-based tracking host. If the truck/container stops at an intermediate destination or pauses, the intermediate location is communicated to the vision track routine and the location is stored in system memory. The vision-based tracking host stores an annotated map of the terminal yard and as such the vision tracking routine has knowledge of where the parking areas, trouble booth, and other locations are throughout the terminal confines.

As shown in FIG. 1, when the vehicle and associated chassis and container move to a designated parking spot 190 the vision based tracking system is aware of the stoppage in movement and the parking location is communicated to the vision-based tracking host, which stores the parking location in system memory. The vision tracking system is able to recognize and store in system memory specific operations, such as the vehicle unhooking from the chassis and the vehicle departing from the parking location. Once the container is parked and the information is communicated to the vision-based tracking system, the tracking system is able to communicate, in real-time, the location of the container to the TOS.

The vision-based, tracking routine provides numerous capabilities in tracking and monitoring object movement and location. These capabilities include, but are not limited to:
1. Analyzing the image in which the vehicle/container appears;
2. Recognizing vehicles, chassis and containers within images;
3. Correlating object movement with system time;
4. Knowing the location, (relative and absolute), of the system imaging device that is within the field of view of the object;
5. Storing and maintaining a map of the surface area of each imaging device's field of view.
6. Knowing the location of surface features of the terminal yard, such as permanent parking locations, temporary parking locations, road intersections, trouble booths and other features.
7. Determining the relative position of a vehicle within a loading/unloading queue In addition, the vision-based, tracking routine can characterize the objects being tracked and identified, such as (a) vehicle-only; (b) container-only; (c) chassis-only; (d) container on chassis; (e) vehicle having chassis only; (f) vehicle having chassis and container; (e) the type or style of container; (f) rail car; (g) container handling equipment, or the like. The vision-based, tracking routine also provides the capability to recognize and record specific object actions, such as (a) vehicle unhooking from a chassis; (b) vehicle hooking up to a chassis; (c) container handling equipment removing a container from a chassis (d) container handling equipment moving a container, or the like. Besides recognizing objects and characterizing objects the vision-based scene analysis routine also provides the capability to disregard certain objects that would otherwise inhibit proper implementation of the system. Objects of disregard may include vehicles not associated with shipping containers, such as pickup trucks, passenger vehicles and the like, individuals and other auxiliary objects not requiring tracking or location identification.

In one embodiment of the invention, the vision-based, tracking system implements multiple imaging devices positioned on support structures (i.e., poles) throughout the confines of the terminal yard. The imaging devices are typically positioned in a grid-like fashion to allow for field-of-view coverage for the entire surface area of the terminal. The multiple imaging device system allows for tracked objects to be passed off from one imaging device to another imaging device when the object moves into and out of the imaging device's field of view.

FIG. 1A provides for a schematic diagram of a system 100 for monitoring object movement at a transit terminal, in accordance with an embodiment of the present invention. In the illustrated embodiment, two pole stations of imaging devices 110 are provided, however in a typical transit terminal multiple pole stations will be provided in order to provide a field of view to the entire transit terminal. Each pole station includes multiple imaging devices positioned about the pole so as to provide a 360 degree field of view of an image coverage area. The imaging devices at pole station are in communication with a vision-based tracking host 120. Each vision-based tracking host executes a vision-based scene analysis routine 130. The vision-based tracking hosts are in communication with the central tracking server 140 which executes a correlation routine 142 that keeps track of the movement of objects from pole station to pole station (or from host to host). The central tracking server is typically in communication with the OCR system 150, such that the identifying information of the OCR system is communicated to the central tracking system and is used in the correlation routine to identify objects that are moving from one pole station to another pole station. Once the central tracking server executes the correlation routine the information is communicated, via data link 144, to a Terminal Operating System (TOS) 146.

FIG. 2 is a schematic illustration of a multiple imaging device system for vision-based, location-tracking of objects, in accordance with an embodiment of the present invention. While this embodiment depicts a single dimensional configuration, in a more conventional embodiment the imaging devices will be positioned in a grid-like, 2-dimensional array. The FIG. 2 illustration depicts four imaging devices 112, 114, 116 and 118 that are positioned along path 200 such that imaging device provide for a continuous field of view for an object that moves along path 200. As the vehicle 160 (having a corresponding chassis 170 and container 180) moves along the path it initially encounters the field of view of imaging device 112, followed by the field of view of imaging devices 114, 116, 118. Field of view overlap regions allow for the requisite time required for the vision based, tracking system to transition from one field of view to the subsequent field of view.

FIG. 3 is a block diagram of a composite system for vision-based, location-tracking of containers implemented in conjunction with a container identification system and a terminal operating system, in accordance with an embodiment of the present invention. The vision-based, tracking routine system 100 is implemented on a vision-based tracking host 120 via processor 122 that runs vision-based scene analysis routine 130. The vision based tracking routine is in communication with imaging devices 110 that input images to the routine. As depicted the imaging devices are shown in a four unit array configuration, which provides for an approximately 360-degree field of view within the context of a 3-dimensional grid-array. Additionally, the routine is in communication with a timing means 132, typically an internal clock and a location means 134, typically in the form of stored maps. The vision-based tracking host is typically in communication with a network 210 that provides for bi-directional communication with the OCR system 150, the TOS 146 and other similar vision-based tracking hosts 120, as required by the system.

In an alternate embodiment of the present invention, the vision-based tracking system provides the ability to monitor, quantify and characterize vehicles within a queue or staging area. As shown in FIGS. 4A and 4B, in the typical marine, automotive or rail shipping terminal, vehicles 160 with containers 180 enter a gate area 220 and then proceed to a pedestal 230 for processing or checking in. During certain periods of high volume vehicle congestion is likely to occur in the form of lines of trucks in the lanes leading to each pedestal. Normal imaging devices only provide for the site administrators to observe the congested line-up and the queue and do not provide any further information that may remedy the congestion.

In the context of the queuing area, the vision-based tracking system provides for an automated method of counting the number of vehicles in the queuing area and in each lane; characterizing the vehicle based on whether the vehicle has a chassis and/or a container; measuring the speed of travel or time-in-lane; or detecting movement of vehicles in the backward direction. By providing for this type of information the vision-based tracking system is able to provide real-time monitoring of the queuing area and redirect vehicles based on the character of the vehicle, the time-in-lane assessments or other relevant queuing area data.

FIG. 5 is a block diagram of a composite system for vision-based, vehicle monitoring at queuing areas, in accordance with an embodiment of the present invention. A vision-based monitoring imaging device 110 is in communication with a vision-based monitoring host 120. In the depiction shown a single imaging device is implemented, although in other embodiments multiple imaging devices may be positioned about the queuing area to accommodate a field of view for the overall surface area of the queuing area. The imaging device sends images of the queuing area to the vision-based host 120, in which a processor 122 implements a vision tracking scene analysis routine 130. The scene analysis routine 130 will typically rely on system timing means 132 and system location means 136, such as a stored queuing area map 136 to analyze the image of the queuing area. The results of the scene analysis routine will typically be communicated to the TOS, which will use the results to provide real-time monitoring and staging of the queuing area.

FIG. 5A provides a block diagram of a vision-based monitoring system that implements a central tracking server, in accordance with an embodiment of the present invention. In the illustrated embodiment, multiple pole stations of imaging devices 110 are provided. In a typical transit terminal multiple pole stations will be provided in order to provide a field of view to the entire area of the transit terminal. Each pole station includes multiple imaging devices positioned about the pole so as to provide a 360 degree field of view of an image coverage area. The FIG. 5B embodiment depicts a top view of the imaging devices as they would be positioned about a pole. The imaging devices at pole station are in communication with a vision-based tracking host 120. Each vision-based tracking host includes a processor 122 that executes a vision tracking scene analysis routine 130. The scene analysis routine 130 will typically rely on system timing means (not shown in FIG. 5B) and system location means 136, such as a stored queuing area map 136 to provide a point of reference for the objects in the image.

The vision-based tracking hosts are in communication with the central tracking server 140. The central tracking server will include a processing device 148 that executes a correlation routine 142 that keeps track of the movement of objects from pole station to pole station (or from host to host). The correlation routine will receive tracking data from each pole station and determine when each object/vehicle crosses a boundary to another finite pole station area of observation. The central tracking server will communicate with the OCR system 150 to determine the identity of objects in the tracking information. In addition the central tracking server will typically store a master map 143 of the transit terminal that is used by the correlation routine and disseminated to the host terminals on an as-needed basis. Once the central tracking server executes the correlation routine the information is typically reformatted by reformatting routine 145 prior to be communicated to the Terminal Operating System (TOS) 146.

In yet another embodiment of the present invention, the vision-based monitoring system provides the ability to monitor the movement of vehicles from one processing station to another. In a typical transit terminal, vehicles (with or without containers), enter through an entry lane, (portal), and then proceed to a transaction pedestal where they stop and conduct business. FIGS. 6A and 6B are side-view and top-view schematic drawings of vehicles being tracked in a portal and pedestal terminal environment by vision-based tracking, in accordance with an embodiment of the present invention. In the top view depiction, the vehicle 160 encounters the OCR portal 240 and then moves to any one of multiple pedestals 230. The OCR data that is collected at the portal (license plate number, chassis number, and container number) by the OCR system must be linked to the moving vehicle so that when the vehicle stops at the pedestal, the pedestal clerk (via the TOS) has all the OCR data available for the vehicle. In other words, the OCR data collected at the portal station follows the vehicle to the pedestal station.

FIG. 7 is a flow diagram of a method for automatically tracking the location of a vehicle and container at a terminal using vision-based tracking, in accordance with an embodiment of the present invention. At stage 300, the vision-based tracking system detects a vehicle, container and chassis at the drive-thru portal. The vehicle passes through the portal, at stage 310 and OCR identifying data is collected at the portal, at stage 320. Both the OCR identifying data and the vision-based tracking data are communicated to the Terminal Operating System (TOS), where further processing of the data occurs at stage 330. At this point the identifying OCR data is linked to the vision based tracking of the vehicle, container and chassis. As the vehicle proceeds from the portal to pedestal the vision-based tracking system continues to track the vehicle, the container and the chassis at stage 340 and the vision-based tracking system communicates this information to the TOS for further processing at stage 330. Once the vehicle reaches the pedestal destination the arrival event is acknowledged by the vision-based tracking system, at stage 350, and the data is communicated to the TOS for further processing, at stage 330. At the pedestal the clerk is able to access a TOS terminal, which, at stage 360, displays TOS information related to the vehicle and, at stage 370, the pedestal transaction occurs.

In addition to identifying and monitoring vehicles, chassis and shipping containers within the confines of the shipping terminal the present invention provides for a system and method to identify container storage locations. In one specific embodiment the storage location may be located on a shipping vessel. The vision-based tracking system is able to detect and identify the location of a container within the storage area and detect and identify where a container has been picked up or set down within the storage area. FIG. 8 is a schematic diagram of a system for location-identification of containers located on a shipping vessel, in accordance with an embodiment of the present invention. A vision-based tracking system imaging device 110 or an array of multiple imaging devices is positioned above a shipping vessel 400. In the depicted embodiment the imaging devices 110 are positioned on a quay crane 410 to provide for complete field-of view coverage for the entire area of the shipping vessel. Other means of mounting and positioning the imaging devices above the vessel are also feasible.

The vision-based system provides the opportunity to see the vessel's grid in real-time and map the grid to a standard frame of reference. In this regard, the vision-based tracking system is able to correlate the standard frame of reference with the position/location of the Quay (Q) crane. Individual containers and container characteristics can be identified within the standard frame of reference (SFOR). The vision-based tracking system is able to monitor the location of the container, store the storage information and communicate the movement of the containers within the SFOR to the corresponding TOS. By combining the vision-based tracking of containers on a vessel with an OCR identifying system, it is possible to identify the position, (within the vessel), of a particular container.

While the system for identifying and monitoring location of containers on vessels implements vision-based tracking imaging devices mounted on the boom of a quay crane, it is also advantageous, from a security standpoint, to position vision-based tracking imaging devices under the quay crane or in the landing zone. FIG. 9 is a schematic representation of a vision-based tracking system implemented to monitor activity in the landing area associated with a quay crane, in accordance with an embodiment of the present invention. Multiple vision-based tracking system imaging devices 110 are positioned about the quay crane 410 so that they monitor the entire surface area of the landing area 420. In this instance, the vision based tracking system is capable of monitoring, differentiating and tracking objects located near or in the landing zone.

FIG. 10 is a block diagram illustrating the system for monitoring landing zone activity associated with a quay crane, in accordance with an embodiment of the present invention. The landing zone monitoring system 500 is linked to container tracking system 100, which tracks the movement of containers or the head block of the quay crane. The container tracking system would anticipate the location of the container or head block in the landing zone and this information would be conveyed to the landing zone monitoring system. This landing zone monitoring system would use this information to activate alarms that would serve to eliminate hazardous conditions in the area.

Similar to the location-identification of containers on a vessel, this system can also be employed for containers that are stacked within the confines of the shipping terminal. In this application, the imaging device array is typically mounted on a Rubber Tire Gantry (RTG).

In yet another embodiment of the invention systems and methods for triggering a crane-mounted OCR system are provided. The system and method provides for the use of separate imaging device(s) to watch the operation of the crane and position of the container being moved. The imaging devices are in communication with a host-based image processing system with scene-analysis to automatically determine when the container is in view of the OCR imaging devices. Data from the scene-analysis subsystem is used to control the zoom and focus of the OCR imaging devices and to select the appropriate OCR imaging device for operation.

FIG. 11 is a perspective view of a system for triggering crane-mounted OCR, in accordance with an embodiment of the present invention. The triggering system 600 includes one or more triggering imaging devices 610 that are typically mounted to the crane structure 620. The trigger imaging device(s) watch the operation of the crane and position of the container being moved. The trigger imaging devices provide for a wide-angle field of view, as opposed to the OCR imaging devices 630, shown in FIG. 11, which provide for a narrow field of view. The narrow field of view of the OCR imaging devices are the reason that the container 640 must be positioned correctly for the OCR imaging device to read the OCR image 650. As shown, various OCR imaging devices are provided to accommodate the different sizes of the containers.

The based trigger system employs scene analysis in conjunction with the trigger imaging devices to provide, at a minimum the following data; location of the container; direction of travel of the container; size of the container and style of the container.

In order to trigger the OCR system the data that is required by the OCR system includes the weight of the container relative to the level of the OCR imaging device plane (H); the distance of the container relative to the OCR imaging device(s) ($D_1$ and $D_2$); the size and style of container; and the direction of travel of container. FIG. 12 provides a perspective view of the crane 620 and the container 640 and highlights the requisite parameters required to trigger the OCR system, in accordance with an embodiment of the present invention.

In operation the triggering imaging device(s) obtain a three-dimensional view of the container. Multiple imaging devices provide simultaneous multiple views of the same container as it moves within the crane. Using triangulation and image analysis on multiple images it is possible to compute both horizontal and vertical position as well as size, style and direction of travel of the container.

For example, FIGS. 13A and 13B illustrate an example of container images 650 and 660 as captured by two separate triggering imaging devices. Pixel-based image analysis is applied to container images 650 and 660 to compute an actual position. FIG. 13C illustrates an example of a horizontal view image 670 that results from the combined images of FIGS. 13A and 13B. Other views of the combined images result in a corresponding 3-dimensional map of the container. Shape analysis computations are used to derive the actual centroid 680 of the container for each view.

FIG. 14 is a block diagram of the trigger system and the OCR system, in accordance with an embodiment of the present invention. The trigger system 600 is implemented by a triggering system host 700. Images from the triggering imaging devices 610 are captured by the frame grabber routine 710 that is implemented by a processing means 720 within the host. A triggering routine 730 is implemented by the processing means and computes, by example, time, horizontal position of the container, vertical position of the container, container style, direction of travel and other relevant information. This data is then transmitted to the OCR system 800, which uses the information to trigger the OCR imaging devices 630. The images from the OCR imaging devices are implemented by the OCR system to identify the containers.

It may also be advantageous to provide for triggering mechanisms on other types of container handling equipment (CHE) other than large cranes. For example, it may be desirable to provide triggering mechanisms on top handlers and side picks that are used to move containers between truck chassis and grounded stacks, rail cars, and other chassis. In addition, it may be desirable to implement the trigger mechanism on rubber tired gantries (moveable cranes) that are used to move containers between truck chassis and grounded stacks. The OCR system requires a means of knowing when the container is in the proper position for image capture. Similar to quay cranes, in most instances, it is difficult to outfit container handling equipment with feedback sensors. By providing for a vision-based system located on the CHE, triggering information can be transmitted to the OCR system when the container is in the proper image capture position.

FIG. 15 depicts a schematic drawing of a top pick, container handler equipped with a vision-based OCR triggering system, in accordance with an embodiment of the present invention. The container handling equipment 900 is equipped with one or more triggering imaging devices 610 that allow for the movement of the container 640 to tracked and analyzed for the purpose of identifying when the container is in position suitable for OCR image capture (the OCR imager is not shown in FIG. 15).

Thus, the embodiments of the invention herein described provide for systems and methods for shipping container location-identification using an automated vision based tracking system. Such a system is ideally suited to provide minimal error rates, low cost implementation, real-time data and automatic merging of data with corresponding container identification systems and terminal operating systems. The systems and methods of the present invention provide for location-tracking of containers without the need to retrofit containers with a tagging or marker device. The vision-based system incorporates the use of multiple imaging devices and a hand-off method for tracking the location of the containers over extended distances.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for monitoring the movement of objects in a transit terminal, the system comprising:
    a plurality of imaging devices positioned about the transit terminal such that positioning of the imaging devices provides for a continuous field of view for an object that moves throughout any area of the transit terminal; and
    one or more object monitoring and tracking hosts in communication with one or more of the plurality of imaging devices, at least one of the hosts having a processor configured to execute a vision-based scene analysis routine to monitor, in real-time, the movement of objects in the transit terminal.

2. The system of claim 1, wherein the transit terminal is one or more of an automotive transit terminal, a rail transit terminal, a marine transit terminal, and an intermodal transit terminal.

3. The system of claim 1, further comprising a central tracking server in communication with the one or more object monitoring and tracking hosts, wherein the server includes a processor configured to execute a correlation routine to track objects as they move from the field of view of one or more of the plurality of imaging devices controlled by a first host to the field of view of one or more of the plurality of imaging devices controlled by a second host.

4. The system of claim 3, further comprising an Optical Character Recognition (OCR) identifying system in communication with the central tracking server configured to provide object identifying information to the correlation routine.

5. The system of claim 4, further comprising a network interface configured to provide for communication between the OCR identifying system and the central tracking server.

6. The system of claim 5, wherein the network interface is configured to provide for communication between the central tracking server and a transit Terminal Operating System (TOS).

7. The system of claim 4, wherein at least one of the OCR identifying system and the central tracking server is configured to communicate with a Terminal Operating System (TOS) configured to manage the transit terminal based on the object identifying information provided by the OCR identifying system and object tracking information provided by the central tracking server.

8. The system of claim 3, further comprising a timing mechanism in communication with the central tracking server configured to provide clock functions to the correlation routine.

9. The system of claim 3, further comprising a memory unit configured to store one or more transit terminal maps that are used in conjunction with the correlation routine to determine object location and track movement.

10. The system of claim 1, further comprising an Optical Character Recognition (OCR) identifying system in communication with the one or more hosts, wherein the OCR identifying system is configured to identify the objects upon entrance to the transit terminal and is further configured to provide object identifying information to the scene analysis routine.

11. The system of claim 10, further comprising a network interface configured to provide for communication between the OCR identifying system and the one or more hosts.

12. The system of claim 11, wherein the network interface is configured to provide for communication between the one or more hosts and a transit Terminal Operating System (TOS).

13. The system of claim 1, wherein the objects are one or more of a shipping container, a chassis, and a vehicle.

14. The system of claim 1 further comprising a timing mechanism in communication with the one or more object monitoring and tracking hosts configured to provide clock functions to the scene analysis routine.

15. The system of claim 1, further comprising a memory unit configured to store one or more transit terminal maps that are used in conjunction with the scene analysis routine to determine object location and track movement.

16. A method for identifying and tracking the movement of objects at a transit terminal, the method comprising the steps of:
    identifying a transit terminal-related movable object proximate an entry point of he transit terminal;
    communicating object identification information to a Terminal Operating System (TOS);
    providing object image data to a vision-based tracking system;
    implementing a scene analysis routine within the vision-based tracking system; and
    communicating scene analysis routine data to the TOS for managing the object at the transit terminal.

17. The method of claim 16, wherein the step of identifying an object proximate an entry point of the transit terminal further comprises using Optical Character Recognition (OCR) to identify the object.

18. The method of claim 16, wherein the step of identifying a terminal-related movable object proximate an entry point of the transit terminal further defines the object as one of a shipping container, a vehicle, and a chassis.

19. The method of claim 16, wherein the step of providing object image data to the vision-based tracking system further comprises capturing, in real-time, images of the object and communicating the images to the vision-based tracking system.

20. The method of claim 16, further comprising the step of identifying a form of the object upon providing the object image data to the vision-based tracking system.

21. The method of claim 20, wherein the step of identifying a form of the object upon providing the object movement data to the vision-based tracking system further defines the form of the object as chosen from the group consisting of a container, a chassis and a vehicle.

22. The method of claim 16, further comprising the step of correlating object image data with vision-based tracking system time.

23. The method of claim 22, wherein the step of correlating object image data with vision-based tracking system time is performed to provide an estimate of the object's arrival time at a specified location.

24. The method of claim 16, further comprising the step of identifying an action of the object upon providing the object image data to the vision-based tracking system.

25. The method of claim 24, wherein the step of identifying an action of the object upon providing the object image data to the vision-based tracking system further defines the action of the object as chosen from the group consisting of hooking/unhooking a chassis from a vehicle, removing or adding a container from/to a chassis, and moving a container about the transit terminal.

26. A method for monitoring vehicles at a staging area in a transit terminal, the method comprising the steps of:
    monitoring at a transit terminal, with one or more imaging devices, one or more vehicle pedestals and a queuing area associated with the pedestals;
    providing image data from the pedestals and the queuing area to a vision-based monitoring system; and
    managing the vehicle pedestals and the queuing area based on the image data provided to the vision-based monitoring system.

27. The method of claim 26, wherein the step of managing the vehicle pedestals and the queuing area based on the image data provided to the vision-based monitoring system further comprises redirecting vehicles in the queuing area based on the image data provided to the vision-based monitoring system.

28. The method of claim 26, wherein the step of managing the vehicle pedestals and the queuing area based on the image data provided to the vision-based monitoring system further comprises assessing the number of vehicles at the pedestals and in the queuing area based on the image data provided to the vision-based monitoring system.

29. The method of claim 26, wherein the step of managing the vehicle pedestals and the queuing area based on the image data provided to the vision-based monitoring system further comprises characterizing the vehicles at the pedestals and in the queuing area based on the image data provided to the vision-based monitoring system.

30. The method of claim 26, wherein the step of managing the vehicle pedestals and the queuing area based on the image data provided to the vision-based monitoring system further comprises measuring the speed of travel of the vehicles based on the image data provided to the vision-based monitoring system.

31. The method of claim 26, wherein the step of managing the vehicle pedestals and the queuing area based on the image data provided to the vision-based monitoring system further comprises detecting direction of movement of a vehicle based on the image data provided to the vision-based monitoring system.

32. A system for monitoring vehicles at a staging area in a transit terminal, the system comprising:
    a one or more imaging devices positioned about the staging area in a transit terminal such that the imaging devices provide for a continuous field of view for an object that moves through a queuing area and a pedestal area associated with the staging area; and
    one or more object monitoring and tracking hosts in communication with the one or more imaging devices having a processor that executes a vision-based scene analysis routine to monitor, in real-time, objects in the staging area.

33. The system of claim 32, wherein the transit terminal is one or more of a truck transit terminal, a rail transit terminal, a marine transit terminal, and an intermodal transit terminal.

34. The system of claim 33, further comprising a central tracking server in communication with the one or more object monitoring and tracking hosts, wherein the server includes a processor configured to execute a correlation routine to track objects as they move from the field of view of one or more of the plurality of imaging devices controlled by a first host to the field of view of one or more of the plurality of imaging devices controlled by a second host.

35. The system of claim 34, further comprising an Optical Character Recognition (OCR) indentifying system in communication with the central tracking server configured to provide object identifying information to the correlation routine.

36. The system of claim 32, further comprising an Optical Character Recognition (OCR) identifying system in communication with the one or more hosts configured to identify the vehicles upon entrance to an OCR portal.

37. The system of claim 32, further comprising a Terminal Operating System (TOS) in communication with the one or more object monitoring and tracking hosts, wherein data from the vision-based scene analysis routine is communicated to the TOS.

38. A method for real-time monitoring of storage of a transit container at a transit terminal, the method comprising the steps of:
providing for one or more imaging devices to monitor a transit container storage area;
providing real-time image data from the imaging devices to a vision-based monitoring system; and
managing the containers in the storage area based on the image data provided to the vision-based monitoring system.

39. The method of claim 38, wherein the step of providing for one or more imaging devices to monitor a transit container storage area further comprises providing for one or more imaging devices proximate a shipping vessel that monitor a storage area within the shipping vessel.

40. The method of claim 39, wherein the step of providing for one or more imaging devices proximate a shipping vessel that monitor a storage area within the shipping vessel further comprises providing for one or more imaging devices affixed to a quay crane that is positioned proximate a shipping vessel that monitor a storage area within the shipping vessel.

41. The method of claim 38, wherein the step of managing the containers in the storage area based on the image data provided to the vision-based monitoring system further comprises managing change in storage locations for the containers.

42. A system for real-time monitoring of the storage of a transit container at a transit terminal, the system comprising:
one or more imaging devices positioned proximate a container storage area, such that the imaging devices provide for a continuous field of view for one or more containers stored in the storage area; and
one or more object monitoring and tracking hosts in communication with the one or more imaging devices having a processor configured to execute a vision-based scene analysis routine to monitor, in real-time, containers in the storage area.

43. The system of claim 42, wherein the one or more imaging devices are located on a quay crane that is positioned proximate a container storage area located on a shipping vessel.

44. The system of claim 42, further comprising a central tracking server in communication with the one or more object monitoring and tracking hosts, wherein the server includes a processor configured to execute a correlation routine to track objects as they move from the field of view of one or more of the plurality of imaging devices controlled by a first host to the field of view of one or more of the plurality of imaging devices controlled by a second host.

45. The system of claim 44, further comprising a system for triggering optical character recognition imaging that is configured to communicate with the central tracking server, wherein the system for triggering optical character recognition imaging comprises:
one or more triggering imaging devices configured to capture images of objects proximate an Optical Character Recognition (OCR) station;
a triggering host in communication with the one or more triggering imaging devices, wherein the host includes a processor configured to execute a triggering routine that determines if the object is in a position for OCR;
an OCR system in communication with the triggering host, wherein the OCR system is configured to receive inputs from the triggering routine to commence the capture of images; and
one or more OCR cameras in communication with the OCR system, wherein the one or more OCR cameras are configured to capture images of the optical characters based on commands from the OCR system.

46. The system of claim 45, wherein the triggering routine is further configured to determine the direction of travel of the object.

47. The system of claim 45, wherein the triggering routine is further configured to determine the size of the object.

48. The system of claim 45, wherein the triggering routine is further configured to determine the form of the object.

49. The system of claim 42, further comprising a Terminal Operating System (TOS) in communication with the one or more object monitoring and tracking hosts, wherein data from the vision-based scene analysis routine is communicated to the TOS.

50. The system of claim 49, further comprising an Optical Character Recognition (OCR) identifying system in communication with the TOS configured to provide container identifying information to the TOS for identifying a location position of a container within the storage area.

51. A method for real-time monitoring of an area proximate a landing area associated with a quay crane the method comprising the step of:
providing for one or more imaging devices to monitor a landing area associated with a quay crane;
providing real-time image data from the imaging devices to a vision-based monitoring system; and
managing the landing area associated with the quay crane based on the image data provided to the vision-based monitoring system.

52. The method of claim 51, wherein the step of managing the landing area associated with the quay crane based on the image data provided to the vision-based monitoring system further comprises providing an alarm if hazardous conditions exist in the landing area.

53. A system for real-time monitoring of an area proximate a landing area associated with a quay crane, the system comprising:

one or more imaging devices positioned proximate a landing area associated with a quay crane, such that the imaging devices provide for a continuous field of view of the landing area; and one or more object monitoring and tracking hosts in communication with the one or more imaging devices having a processor that configured to execute a vision-based scene analysis routine to monitor, in real-time, the landing area.

54. The system of claim 53, further comprising a Terminal Operating System (TOS) in communication with the one or more object monitoring and tracking hosts, wherein data from the vision-based scene analysis routine is communicated to the TOS.

55. The system of claim 53, further comprising an alarm configured to be triggered if hazardous conditions are determined to exist in the landing area based on image data provided to the vision-based scene analysis routine.

* * * * *

UNITED STATES PATENT AND TRADEMARK OFFICE
CERTIFICATE OF CORRECTION

PATENT NO. : 7,508,956 B2 Page 1 of 1
APPLICATION NO. : 10/861678
DATED : March 24, 2009
INVENTOR(S) : Scheppmann It is certified that error appears in the above-identified patent and that said Letters Patent is hereby corrected as shown below:

Column 2,
Line 27, "modem" should read --modern--.

Column 17,
Line 33, "he" should read --the--.

Column 19,
Line 13, "indentifying" should read --identifying--.

Column 21,
Line 7, cancel "that".

Signed and Sealed this

Second Day of June, 2009

JOHN DOLL
*Acting Director of the United States Patent and Trademark Office*